US010045659B2

(12) United States Patent
Ferron et al.

(10) Patent No.: US 10,045,659 B2
(45) Date of Patent: Aug. 14, 2018

(54) LID OF CONTAINERS FOR COOKING FOOD

(71) Applicant: BALLARINI PAOLO & FIGLI SPA, Rivarolo Mantovano (MN) (IT)

(72) Inventors: Jacopo Ferron, Casalmaggiore (IT); Massimo Dall'Asta, Casalmaggiore (IT)

(73) Assignee: BALLARINI PAOLO & FIGLI SPA, Rivarolo Mantovano (MN) (IT)

( * ) Notice: Subject to any disclaimer, the term of this patent is extended or adjusted under 35 U.S.C. 154(b) by 599 days.

(21) Appl. No.: 14/665,853

(22) Filed: Mar. 23, 2015

(65) Prior Publication Data
US 2015/0272384 A1 Oct. 1, 2015

(30) Foreign Application Priority Data

Mar. 25, 2014 (IT) .............................. MI2014A0501

(51) Int. Cl.
*B65D 55/00* (2006.01)
*A47J 36/12* (2006.01)
(Continued)

(52) U.S. Cl.
CPC .............. *A47J 36/12* (2013.01); *A47J 27/56* (2013.01); *A47J 36/06* (2013.01); *A47J 37/101* (2013.01); *B65D 51/1633* (2013.01)

(58) Field of Classification Search
CPC .. A47J 36/00; A47J 36/06; A47J 36/12; A47J 27/56; A47J 27/58; A47J 27/62;
(Continued)

(56) References Cited

U.S. PATENT DOCUMENTS 1,633,494 A * 6/1927 Neumann ............... A47J 36/12
220/846
4,457,327 A * 7/1984 Pepper ..................... A61L 2/26
137/67
(Continued)

FOREIGN PATENT DOCUMENTS

CN 2076378 U 5/1991
CN 2289490 Y 9/1998
(Continued)

OTHER PUBLICATIONS

Search Report and Written Opinion dated Nov. 5, 2014 for Italian patent application No. MI20140501.

*Primary Examiner* — Steven A. Reynolds
*Assistant Examiner* — Javier A Pagan
(74) *Attorney, Agent, or Firm* — Vorys, Sater, Seymour and Pease LLP

(57) ABSTRACT

A lid for a container for cooking food, the lid for resting on a free edge of the container, the lid including a covering element, a shaped element and connector for connecting the two elements, the shaped and covering elements configured to allow them to move between: a first closure operating position of the lid, in which the two elements of the lid combine to close the cooking container on which the lid rests, and a second opening operating position of the lid, for allowing venting of the container when the lid rests thereon and to prevent escape from the container. The lid includes at least one thermal actuator, on reaching a first pre-set temperature, for automatically moving the covering element with respect to the shaped element to bring the latter into the opening position, to allow venting of the container when the lid is placed upon it.

14 Claims, 24 Drawing Sheets

(51) Int. Cl.
    *A47J 36/06* (2006.01)
    *A47J 27/56* (2006.01)
    *A47J 37/10* (2006.01)
    *B65D 51/16* (2006.01)

(58) Field of Classification Search
    CPC ............... A47J 37/101; B65D 51/1633; B65D 51/1644; B65D 51/1661; B65D 51/1672; B65D 51/1683; B65D 51/16
    USPC ......... 220/201, 202, 203.01, 203.09, 203.19, 220/203.23, 203.28, 203.29
    See application file for complete search history.

(56) References Cited

U.S. PATENT DOCUMENTS

| | | | | |
|---|---|---|---|---|
| 4,458,711 | A * | 7/1984 | Flider | F16K 17/196 137/493.2 |
| 4,489,883 | A * | 12/1984 | Anderson | F01P 11/0238 220/201 |
| 5,494,005 | A * | 2/1996 | Saur | F01P 7/167 123/41.1 |
| 2003/0057208 | A1 * | 3/2003 | Freiler | F16K 17/196 220/201 |
| 2007/0075078 | A1 * | 4/2007 | Kim | A47J 27/56 220/203.29 |
| 2009/0223379 | A1 * | 9/2009 | Malek Azary | A47J 27/56 99/330 |
| 2011/0006060 | A1 * | 1/2011 | Lin | B65D 43/26 220/201 |
| 2016/0088971 | A1 * | 3/2016 | Lagerlof | A47J 36/06 700/299 |
| 2016/0192804 | A1 * | 7/2016 | Mesmer | A47J 27/56 99/410 |

FOREIGN PATENT DOCUMENTS

| | | |
|---|---|---|
| CN | 102835904 A | 12/2012 |
| DE | 202013101037 U1 | 3/2014 |
| GB | 2357236 A | 6/2001 |
| JP | 2011147756 A | 8/2011 |
| WO | 2006091013 A1 | 8/2006 |
| WO | 2013143272 A1 | 10/2013 |

* cited by examiner

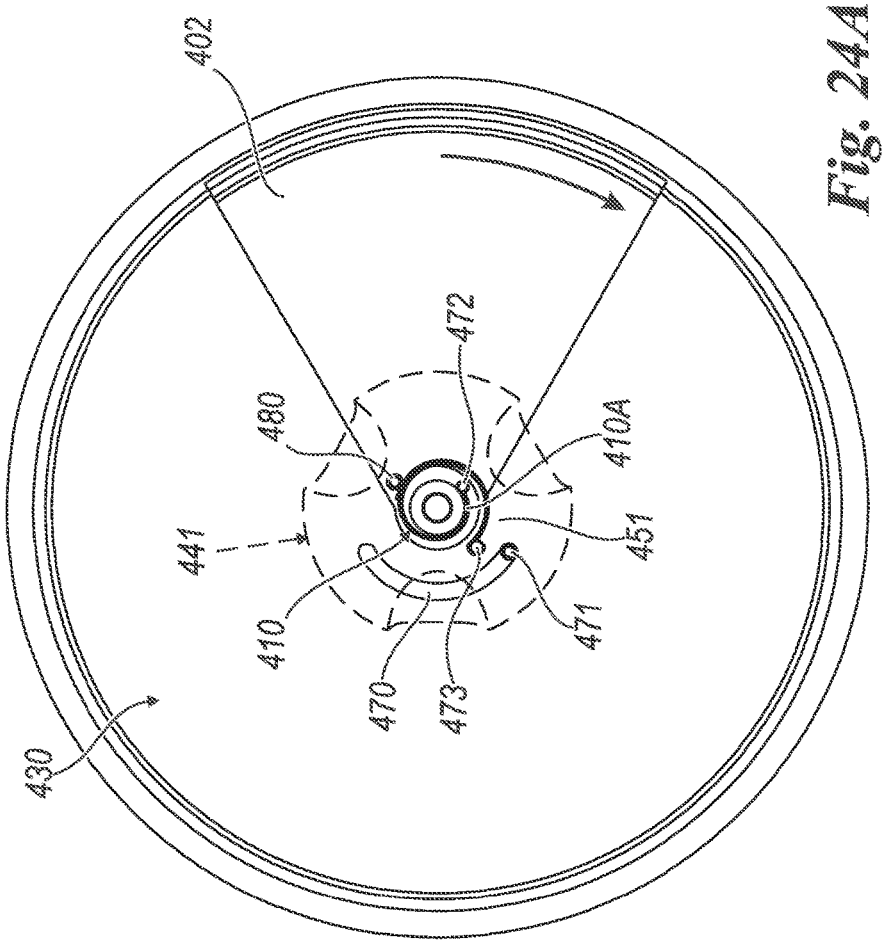

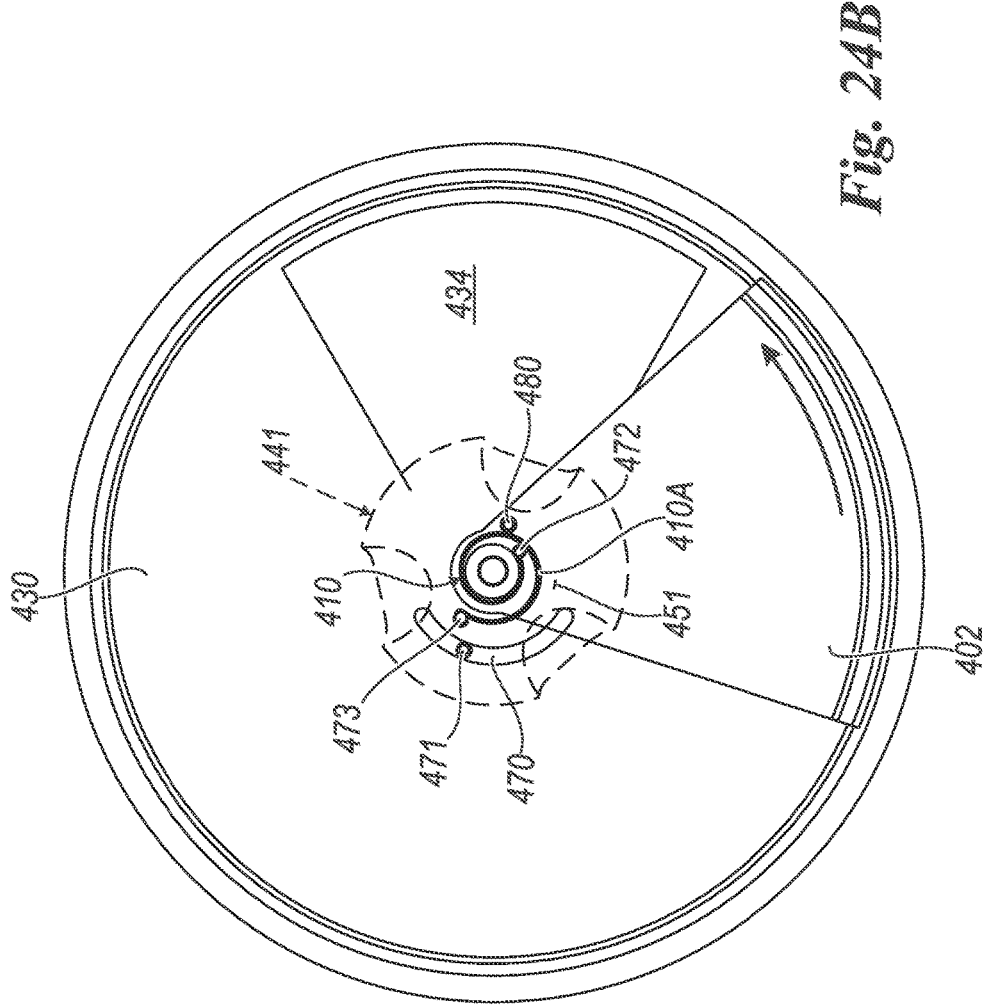

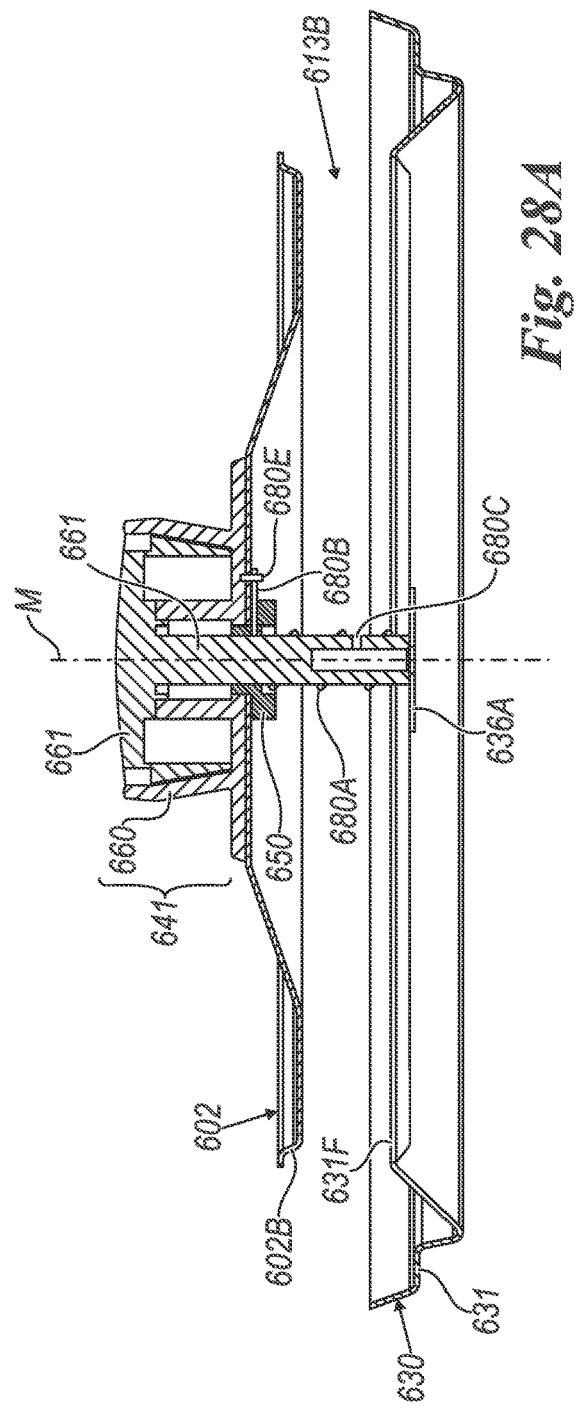

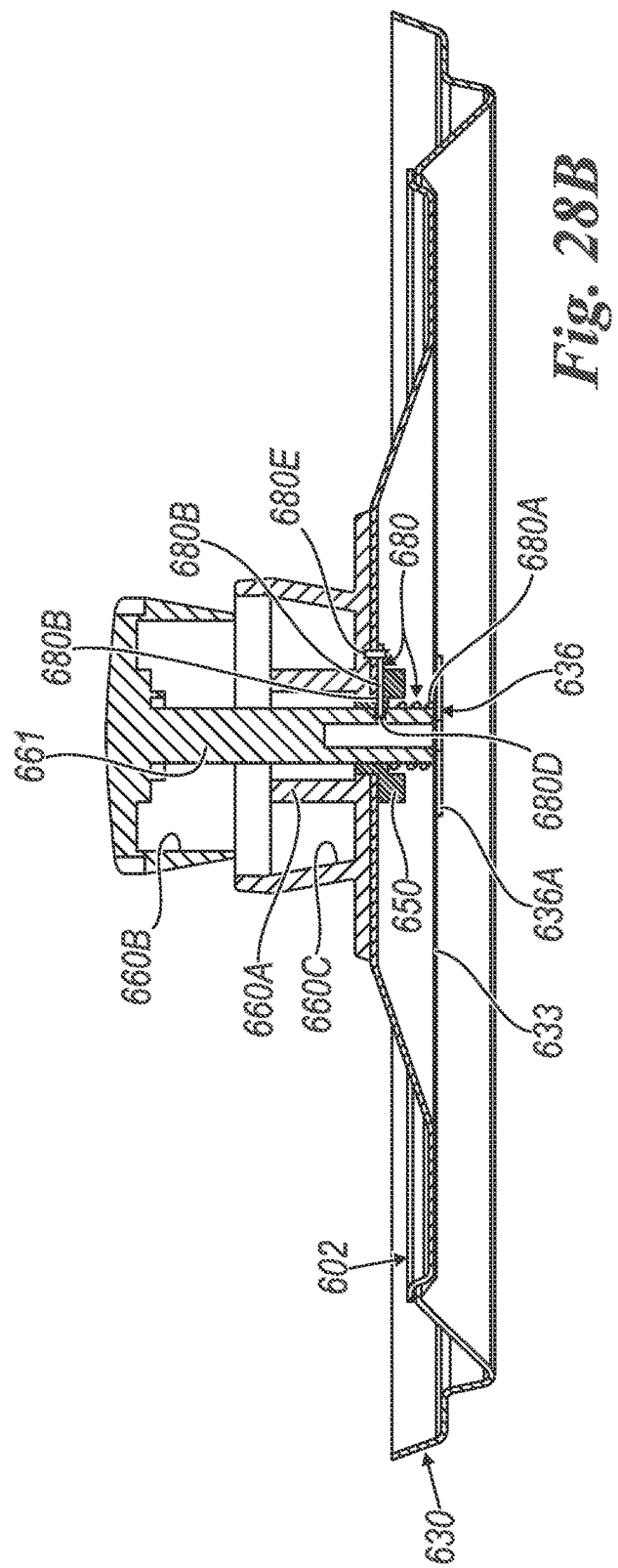

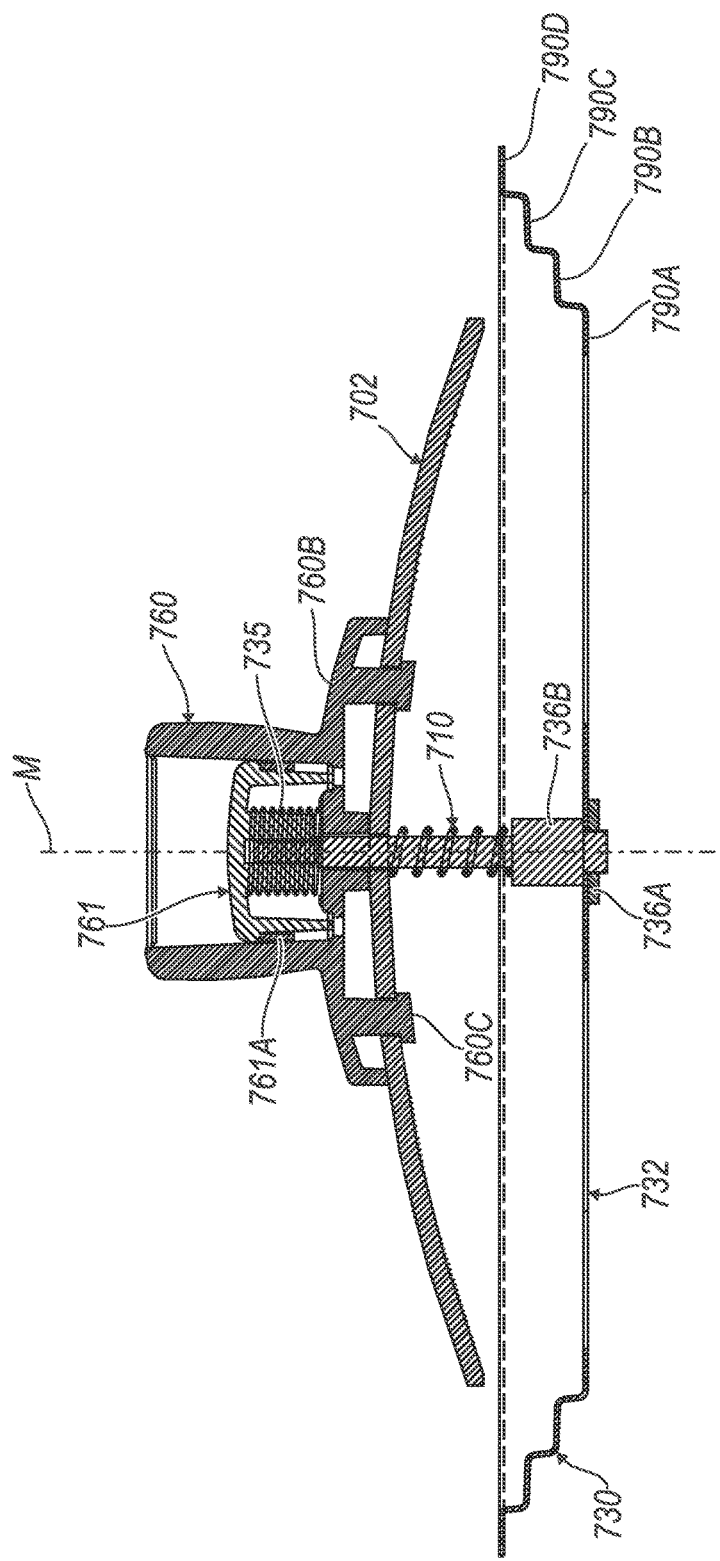

LID OF CONTAINERS FOR COOKING FOOD

This claims the benefit of Italian patent application no. MI2014A000501, filed Mar. 25, 2014, incorporated herein by reference.

The present invention relates to a lid of containers for cooking food.

In this context, a container means any container for cooking, such as: a pot, a saucepan or such like, and a lid means any lid capable of covering said container.

It is known that in any container having a lid, during cooking, near the boiling point of the food contained in the container (for example pasta, rice, pulses, vegetables, etc.) foam can form (or in any event a boiling mixture of a liquid and a food), which can spill over the edge of the container, dislodging the lid and causing the contents of the container to overflow down the sides of the outer walls and onto the hob.

The rising of the foam is due chiefly to the presence of the lid which prevents the normal venting and consequent cooling of the boiling surface.

The use of a lid is however useful and advisable in order to contain the heat inside the pot; this reduces heat dispersal with a consequent saving of energy, and shortens boiling times.

Those who work with cookers know this risk and try to pay maximum attention to every sound generated by a slight vibration of the lid, which is a forewarning that foam is about to escape.

Failure to intervene in time almost certainly results in the overflow of foam, with the possible extinction of the flame (in the case of a gas hob) and in any event the spilling of liquid onto the hob of whatever type.

If gas cookers are being used, this can be very dangerous because extinction of the flame results in an escape of gas into the atmosphere which can become extremely dangerous if the hob has no systems to automatically shut off the gas if there is no flame.

In any case, the overflow of foam causes a spillage of cooking liquid which comes into contact with hot parts of the hob; this causes incrustations that can only be removed with thorough and tedious cleaning operations. Often, it is also necessary to use softening foams or other cleaning products which can be harmful to the user's health.

There are no known specific devices on the market that prevent the above-mentioned drawback.

Some solutions exist that envisage providing the lids with a small hole, on part of the lid or on part of the knob. Opening mechanisms based on the accumulation of condensate generated by the steam can be associated with this hole.

Other lids envisage a valve element comprising a heat-expanding spring to open a slot provided, for example, in the lid's knob at a similar opening in the lid itself.

These systems provide openings that are too small to guarantee sufficient venting of a pot or a saucepan in which several portions of pasta or pulses are boiling.

In fact, these systems only prevent the lid from being violently dislodged from the container by the pressure generated beneath it.

The aim of the present invention is therefore to produce a lid of containers for cooking food, and in particular for boiling them, which is improved compared to the known art and which helps to prevent the overflow of the contents of the container onto which it is fitted when boiling the contents thereof.

These and other aims will be achieved by producing a lid for containers according to the technical teachings of the accompanying claims.

Further features and advantages of the invention will emerge from the description of a preferred but not exclusive embodiment of the lid, given by way of a non-limiting example in the accompanying drawings, in which.

Figure 17:
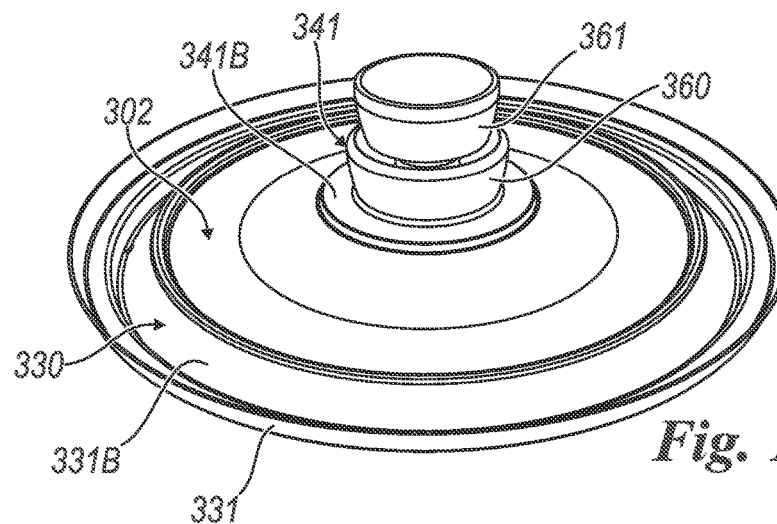
Figure 18:
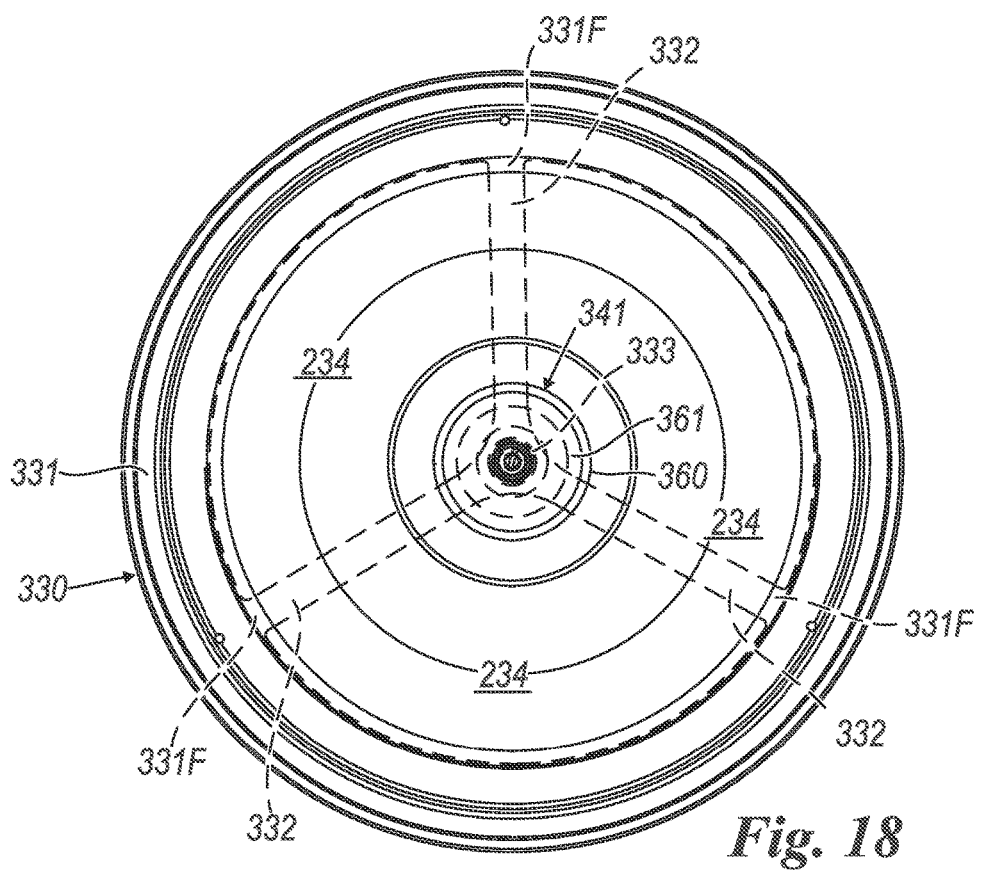
Figure 19:
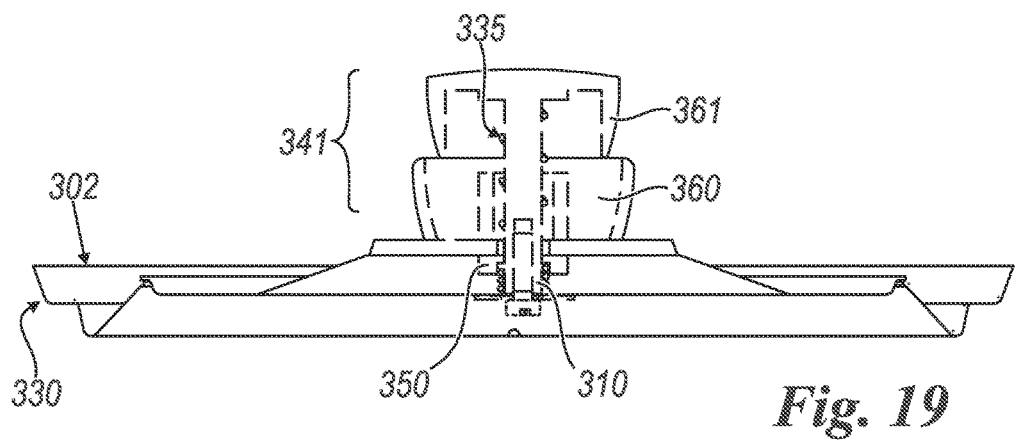
Figure 20:
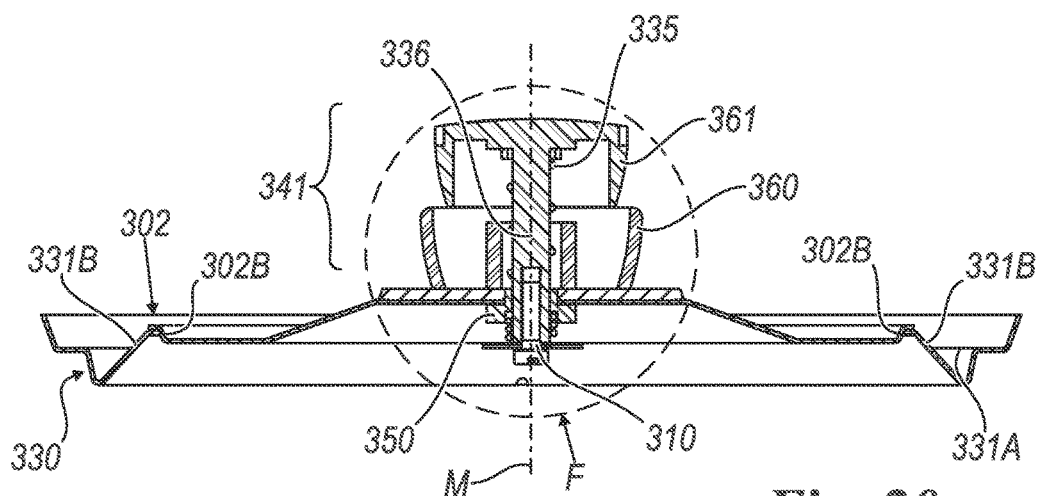
Figure 22:
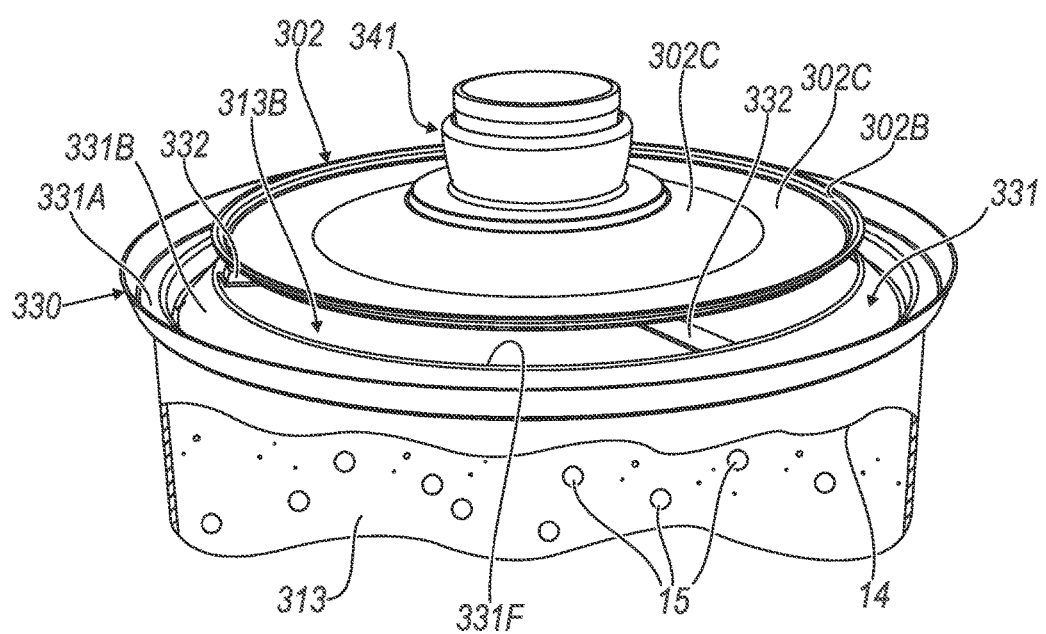
Figure 25:
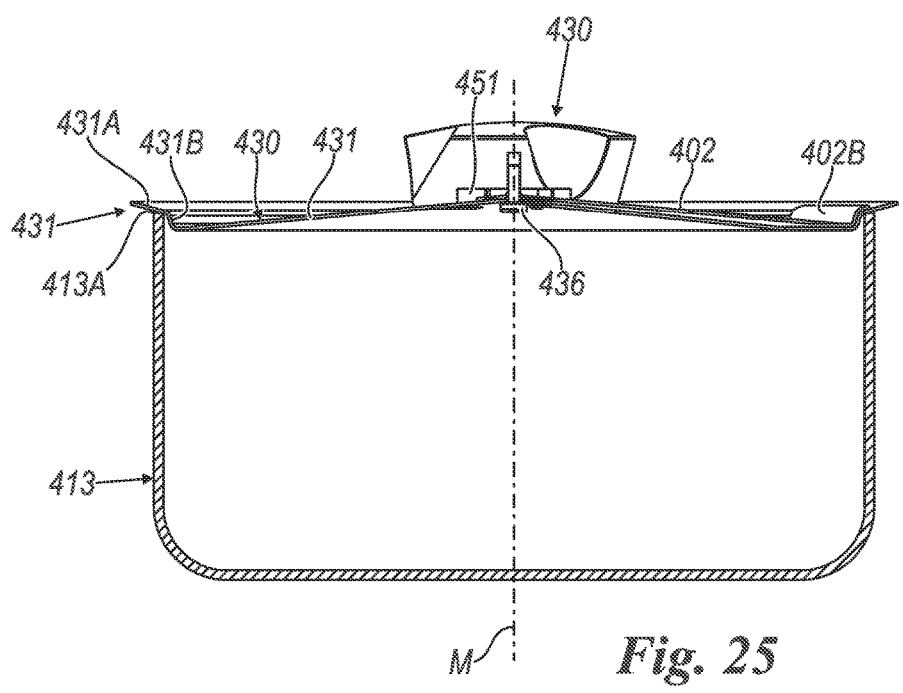
Figure 26:
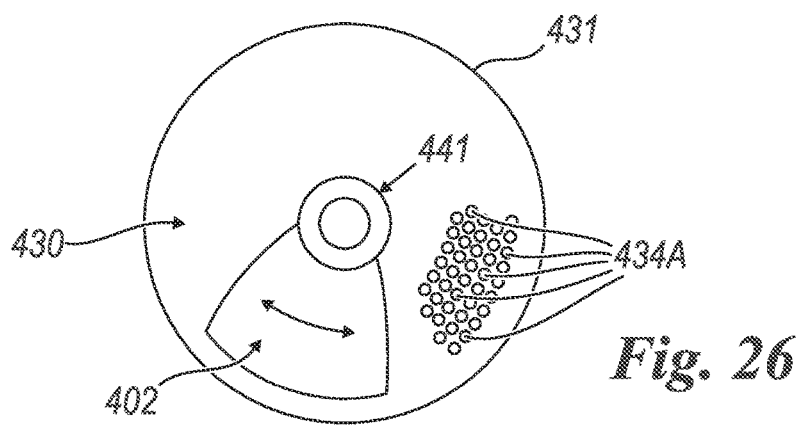

FIGS. 15 A and B show a cross-sectional view with the lid in the opening and closure position respectively;

FIGS. 16 A and B show an enlarged cross-sectional view of a detail with the lid in the opening and closure position respectively;

FIG. 17 is a schematic perspective view of another variation of a lid according to the invention;

FIG. 18 is a top schematic view thereof;

FIGS. 19 and 20 are partial sectional side views thereof, when the lid is in the closed position;

FIGS. 21 A and B are sectional schematic views of the detail indicated by arrow F in FIG. 20, with the lid in a closure position and an opening position respectively;

FIG. 22 is a schematic view of the lid over a container for cooking and in an open position;

FIGS. 23 A and B are perspective views of another variation of a lid according to the invention, shown over a container for cooking and in a closure and opening position respectively;

FIGS. 24 A and B are top views with the lid in a closure and opening position respectively;

FIG. 25 is a cross-sectional schematic view thereof;

FIG. 26 is a top schematic view of a first variation of the embodiment in FIGS. 23-26;

FIGS. 27 A and B are top schematic views of a second variation of the embodiment in FIGS. 23-26;

FIGS. 28 A and B are cross-sectional schematic views of another variation of the invention, wherein the lid is shown in open and closed position respectively.

Figure 29A:
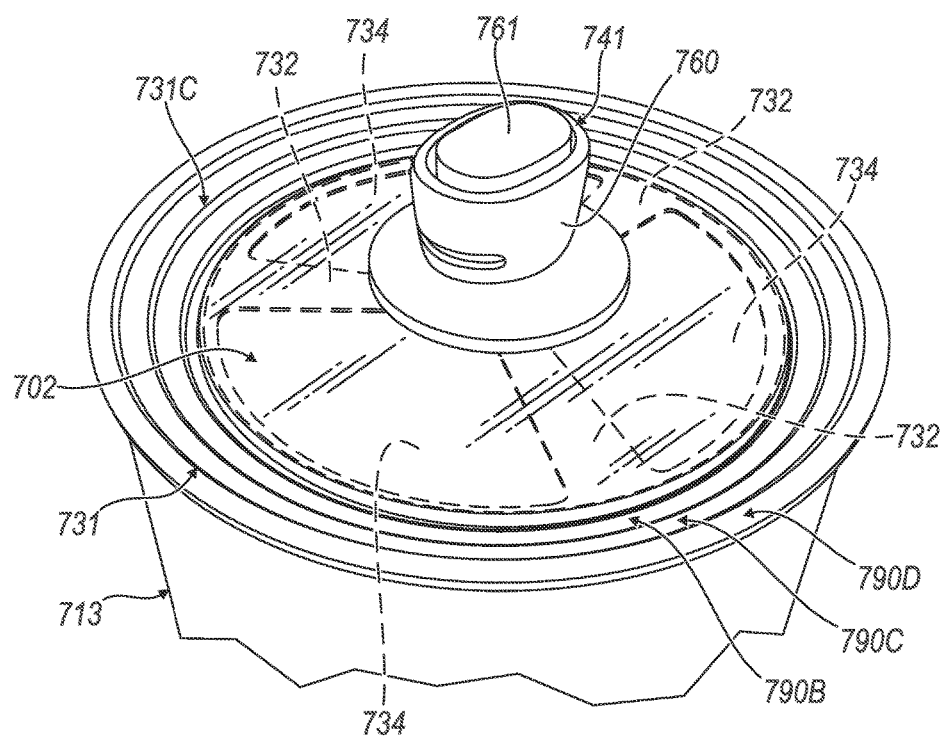
Figure 29B:
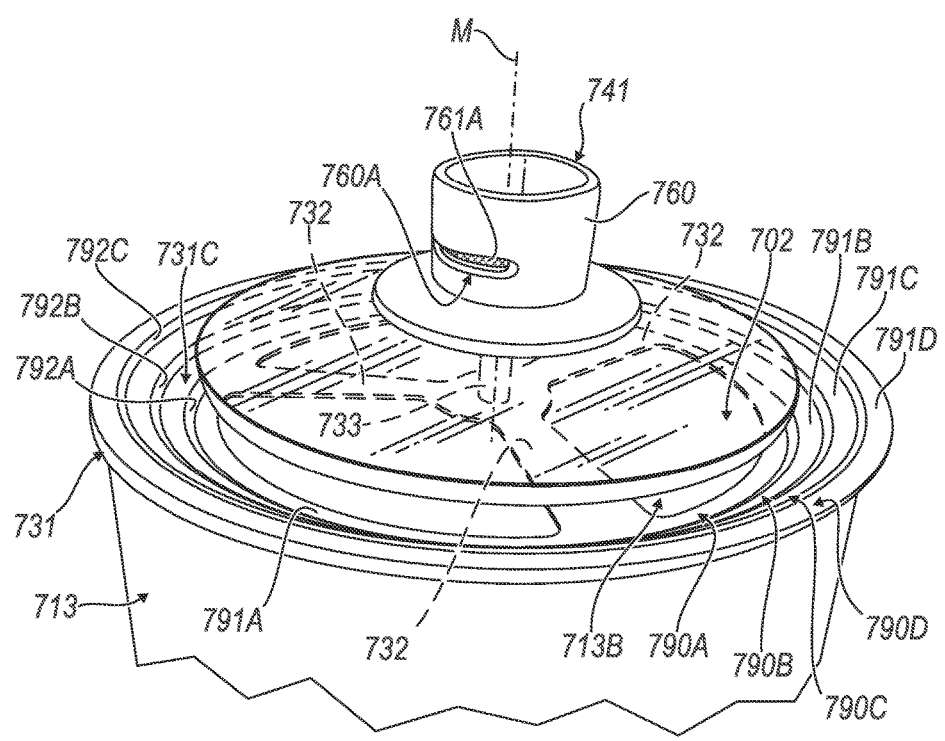
Figure 30A:
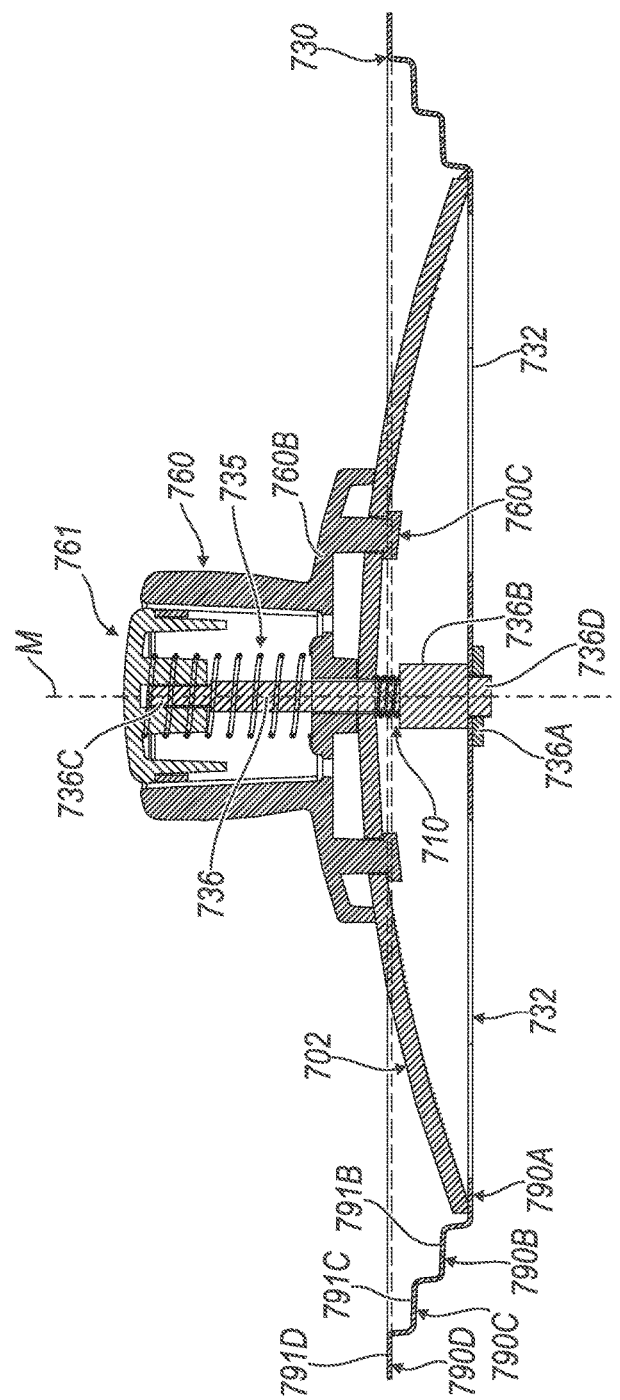

FIGS. 29A and B show transverse sectional schematic views of a further variation of the invention, wherein the lid is represented, respectively, in open and closed position;

FIGS. 30A and B show a sectional schematic view of the lid of FIGS. 29A and 29B.

With reference to the above Figures, a lid 1 is shown for conventional containers 13 designed to cook or boil food.

Figure 2:
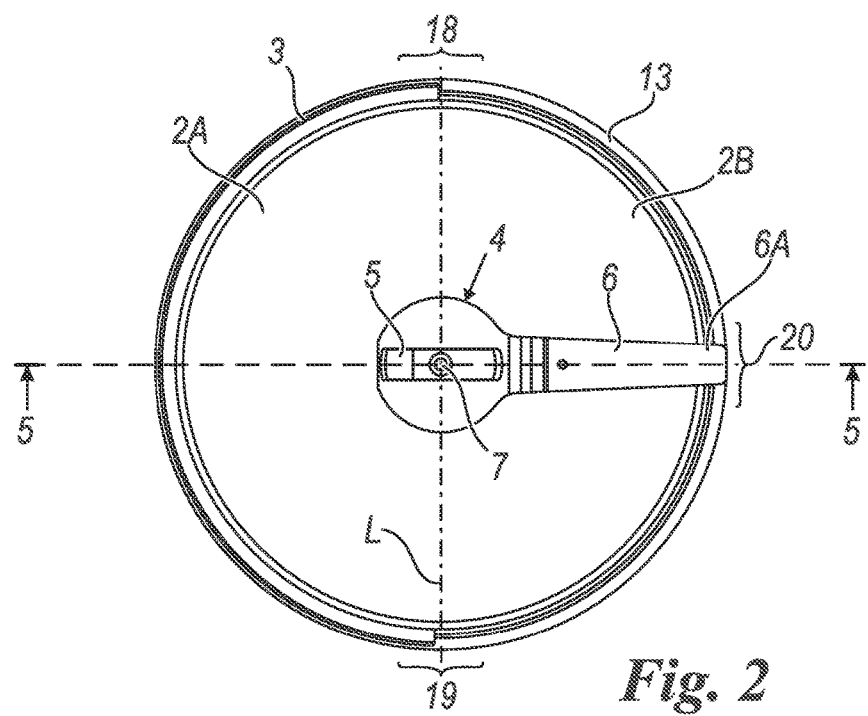
FIG. 2 is a plan view of the lid in FIG. 1 placed on a container.
Figure 3:
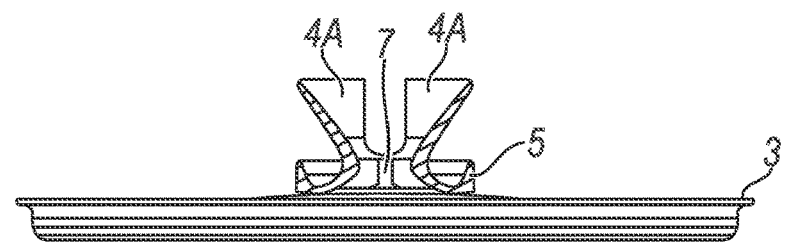
FIG. 3 is a front view of the lid in FIG. 1.
Figure 4:
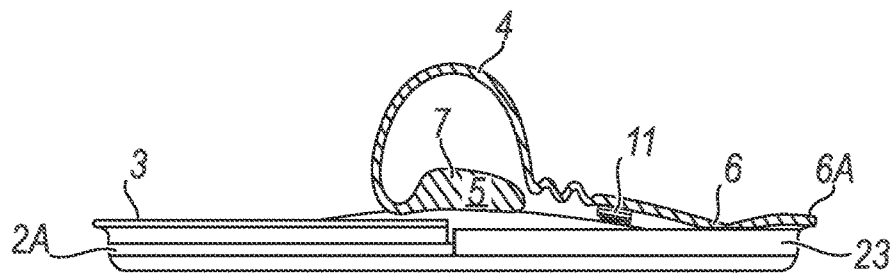
FIG. 4 is a side view of the lid in FIG. 1.

It comprises a covering element 2 which, as shown in FIG. 2, preferably has a substantially circular plan. Obviously, the lid may have any plan form depending on the shape of the opening of the container that it is designed to cover. By way of example, the plan could have a configuration that is elliptical, rectangular, etc.

Figure 5:
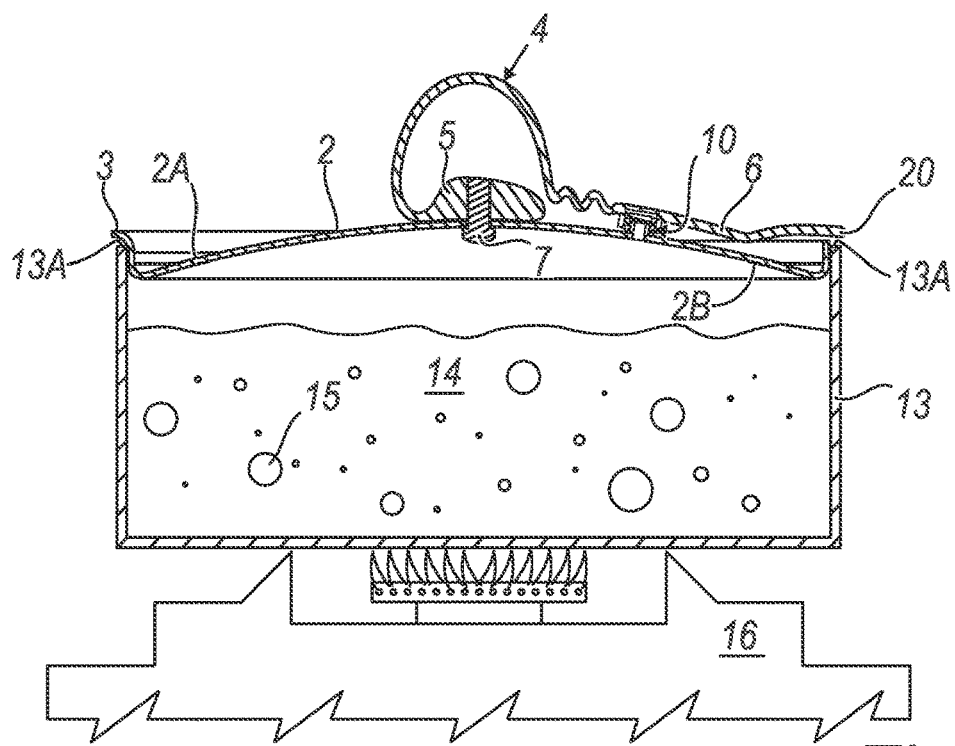
FIG. 5 is a cross-section along Line 5-5 in FIG. 2 of the lid and container on which the lid is placed.

The covering element is suitable for covering and substantially completely closing the mouth of the container 13 (completely closing the mouth of the container means that the covering element is capable of closing at least 95% of this mouth) on which is placed the lid according to the invention (FIG. 5).

The covering element 2 is provided with a rim 3 extending perimetrically round one part 2A thereof and suitable for resting on a corresponding portion of top free edge 13A of the container 13. This part 2A, as easily seen in the plan view (FIG. 2) extends only round one portion of the perimeter of the covering element 2, while it is absent from the other half of the perimeter. Preferably, part 2A extends round approximately half of the outer edge of the lid. This part 2A advantageously extends round a portion of the outer edge 1A of the lid for less than or equal to 50% of the overall length of said edge.

The covering element 2 is secured to a shaped element 4. In the embodiment described here, the shaped element 4 has a base 5 which is appropriately fixed, by a screw 7 for example, to the centre of the covering element 2. From the base extends a curved portion 4B, formed by a pair of arched appendices 4A, which connects to an elongated portion 6 extending radially with respect to the centre of the covering element 2 and which has an end portion 6A which protrudes beyond the perimeter of the covering element. In particular, in the embodiment described, the shaped element protrudes from that part 2B of the perimeter of the covering element that lacks the rim 2A.

Continuing with the description of the invention, note that the covering element has a cylindrical protrusion 8 (clearly visible in the cross-section in FIG. 6) in which an axial hole 9 is made. Around the protrusion is fixed one end of an actuator 10 which in this specific case is a shape memory alloy spring (this type of spring is also known as an SMA spring).

Figure 6:
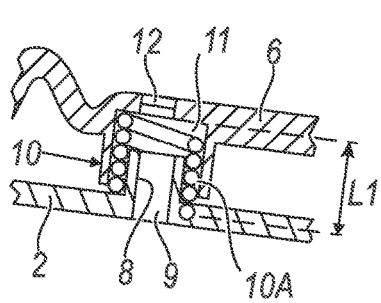
FIG. 6 is a simplified and enlarged section of Detail A in FIG. 4.

The other end of the actuator is inserted and secured in a known way in a housing 11 (in this case having a cylindrical shape) appropriately provided on the shaped element 4, advantageously at its elongated portion. As shown in FIG. 6, the top of the housing 11 is substantially aligned with the hole 9 of the protrusion 8.

The actuator 10, in the case illustrated takes the form of a helical spring 10A, but it could also have a different form such as a strip spring. The actuator is made of particular alloys, of a conventional type for a person skilled in the art, which enable the actuator to be completely stable, in other words enable it not to deform (both in expansion and in compression) up to a pre-set temperature and to deform (completely) on exceeding this pre-set temperature. This pre-set temperature is advantageously above or equal to 80° C. and more preferably above or equal to 90° C.

Alternatively, the actuator could also be made of conventional bimetallic materials that deform (for example bend) on reaching a first pre-set temperature and continue their deformation until reaching a second pre-set temperature.

As FIG. 5 shows, during use, the lid is placed on a container 13, a saucepan or pot for example, that contains water 14 in which food 15 is cooked.

The container is placed over a heat source and in this particular case over a gas hob 16.

As illustrated by the cross-section in FIG. 5, the rim 3 rests on the free edge 13A of the container, along its entire length (of the rim 3, see in FIG. 2), and in particular at a first 18 and a second resting zone 19 shown at the passage between the first part 2A of the perimeter equipped with the rim 3, and the second part 2B which has no such rim.

In this embodiment, the rim 3 runs round the entire half-length of the perimeter, but in fact what is important for the purposes of the present invention is that the lid (or the pot) are shaped so as to create at least one first 18 and one second resting area 19 between the covering element 2 and the container 13.

Furthermore, as clearly shown in FIG. 5, the free end portion 6A of the shaped element 6 creates an additional resting area 20 with the free edge 13A of the container 13. This resting area 20 is made in an end portion 6A of the shaped element that protrudes beyond the perimeter of the covering element 2.

The first 18, the second 19 and the further resting area of the lid according to the invention allow the lid to stay resting on the top free edge 13A of the container 13, given that there are at least three resting points between the lid 1 and the container 13.

In the case described, the aim is for the lid to open (by tilting on the container about an axis passing through the first 18 and the second 19 resting area), when the contents of the container reach approximately 95° C., or before the foam in the container dislodges the lid and escapes from the container.

During the heating of the container and its contents with the lid in the closure position (or with the covering element 2 which rests on the top edge 13A of the container), the hot air that rises from the liquid surface beneath is forced to vent upward only through the holes 9 and 12 (FIG. 6). The air therefore heats the area around the holes 9 and 12 and consequently the actuator 10.

It is calculated that in the position in which the actuator 10 is located, by virtue of all of the heat exchanges that occur with the outside and with the hot air, when the temperature of the water is approximately 95° C., a temperature of around 85° C. is reached in the actuator (these values are given by way of example and clearly can vary depending on the configuration and arrangement of the various parts, the materials used for the specific embodiment, etc.).

Figure 8:
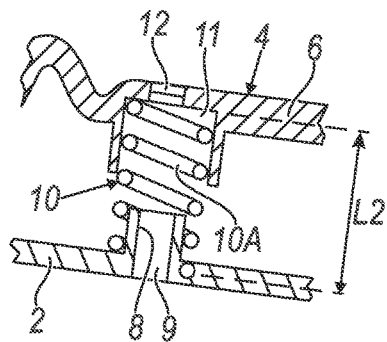
FIG. 8 is an enlarged section of Detail B in FIG. 7.

This being the case the actuator 10, or in the example shown the spring 10A, is therefore made and chosen so that up to a temperature of 85° C. it remains unchanged and with a compressed form, as shown in FIG. 6. On exceeding 85° C., it expands and lengthens so as to distance the covering element 2 from the shaped element 6 (FIG. 8), thus causing the lid to tilt, as clearly shown in FIG. 7.

Purely as an example, the spring could have a diameter of around 1 cm, a length L1 in a compressed condition of 1 cm, and a length L2 of around 3 cm in the activated condition (therefore at a temperature of above 85° C.), capable of generating a force of around 10 N.

In fact, the tilting or inclination of the covering element occurs around an axis L passing through the first 18 (FIG. 2) and the second 19 resting area between the covering element 2 and the free edge 13A of the container 13, since by virtue of the expansion of the actuator above a pre-set temperature, the shaped element 4 and the covering element 2 move away from each other (the shaped element inclines in relation to the covering element and the curved portion 4 bends elastically).

Figure 7A:
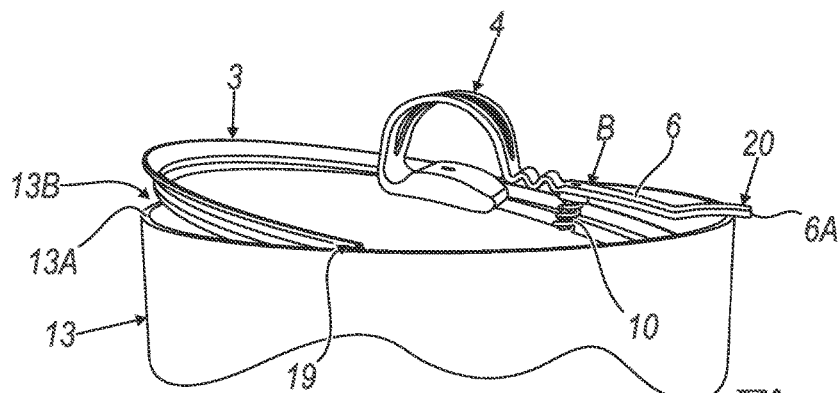
FIGS. 7A, 7B show a simplified and partial diametrical section of the lid of the present invention when it is placed on a container for cooking food, in an opening position.
Figure 7B:
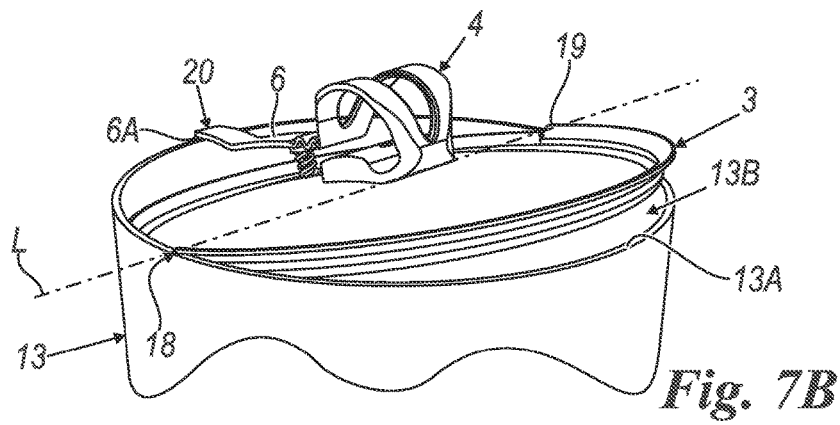

Consequently, the covering element 2 lowers with respect to the resting area 20, thus creating the situation shown schematically in FIG. 7 (here the lid 1 is in the opening position).

Obviously, in order to allow the lid to achieve the opening position it is important to appropriately balance the elasticity of the shaped element 4 and the force of the actuator 10 (spring) which must be capable of bending said element in order to reach the opening position.

Substantially, in the opening configuration, an opening 13B (FIG. 7) is created on the container that is sufficiently large to prevent the contents from escaping, with the benefits of avoiding the drawbacks previously described caused by the undesired formation of foam.

In other words, the invention described allows an automatic tilting of the lid 1 about an axis L passing through the first 18 and the second 19 resting areas on the container 13 below, when a temperature is reached inside the container that is pre-set and close to boiling (which we can set operationally at around 85° C.)

When the temperature of the actuator 10 falls below the set temperature (for example 85° C.) the actuator returns to the dimension L1 in FIG. 6. The particular form and elasticity of the shaped element 4 incline the covering element 2 until the position in FIG. 6 is reached, or so that said covering element closes the container 13 again.

Note that the present embodiment shows a very small actuator, which is appropriately dimensioned during the design phase. This allows its costs to be contained. In fact, the high technology of the materials used to produce it obviously makes it expensive.

The materials and the embodiments of the covering element and the shaped element, like every other component of the lid may be of a different type (chiefly metals or technopolymers).

Figure 1:
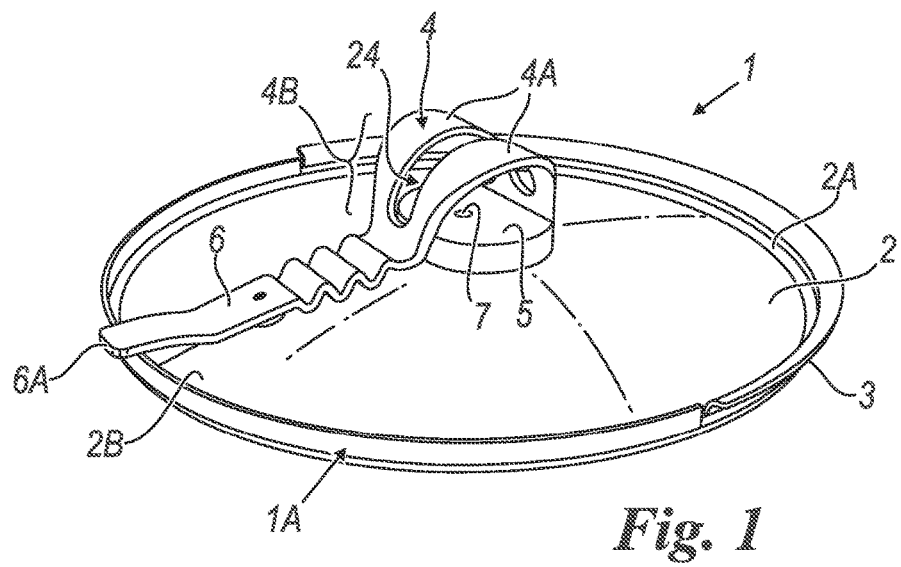
FIG. 1 is a perspective view of a lid according to the present invention, when in the closure position.

Note that in the embodiment described, the shaped element can be grasped laterally at the appendices 4A. Furthermore, between the latter a seat 24 is made (FIG. 1) in which to hold the mixing spoon. The handle of the spoon is inserted into the seat near the bowl end, while the portion of handle distant from the bowl rests on the elongated portion 6 of the shaped element 4, which can in turn have an additional seat (not shown) to contain it.

FIGS. 9-13 show a variation of the embodiment shown in FIGS. 1-8. For the sake of brevity, the elements previously described with reference to the embodiment in FIGS. 1-8 that are common also to the embodiment shown in FIGS. 9-13 will not be described again and will be indicated by the same reference numerals used in FIGS. 1-8 but with the addition of 100.

Figure 9:
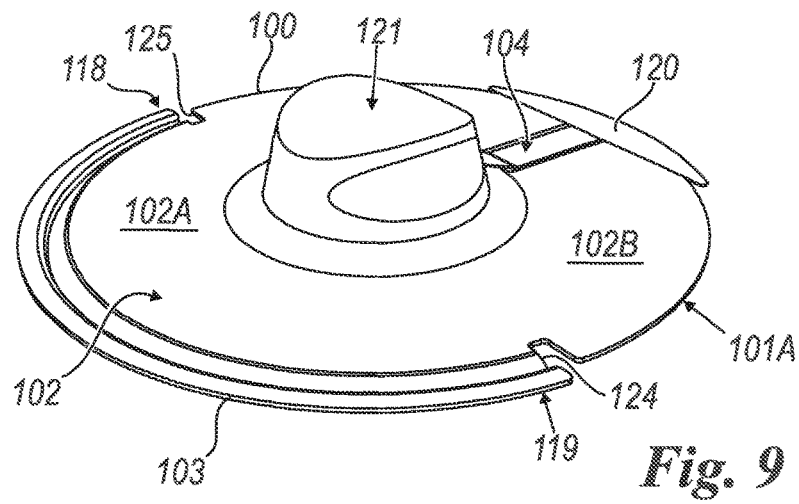
FIG. 9 is a top perspective view of a variation of the lid in FIG. 1.
Figure 10:
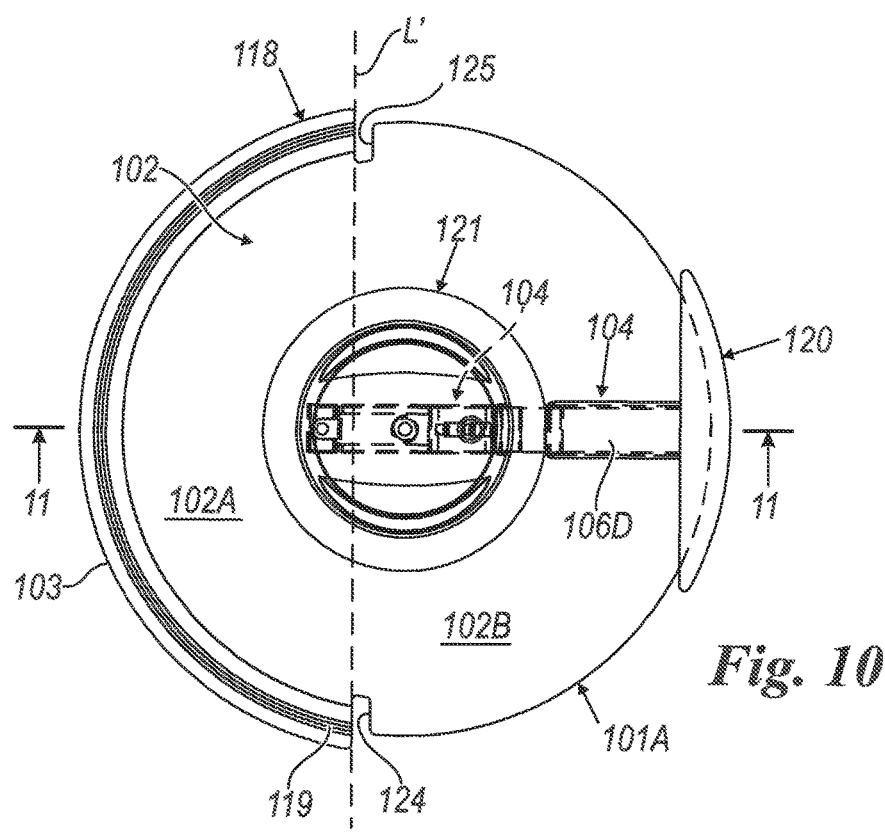
FIG. 10 is a plan view of the lid in FIG. 9.
Figure 11:
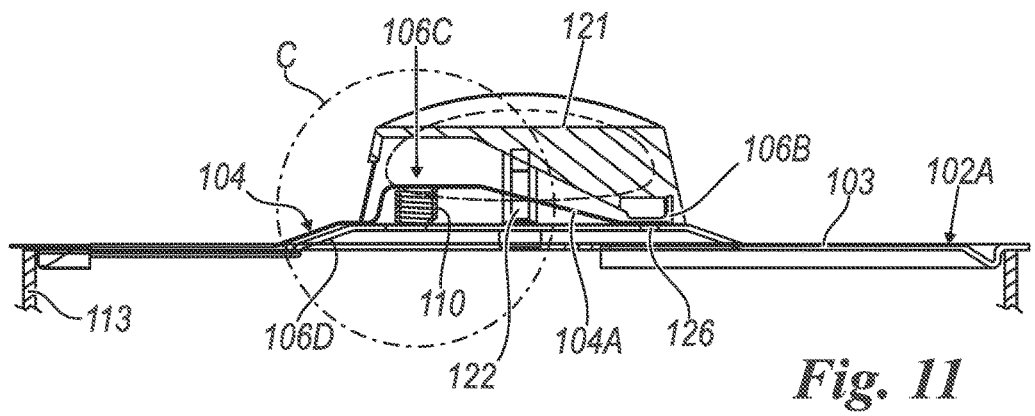
FIG. 11 is a section taken along Line 11-11 in FIG. 10 of the lid and container on which the lid is placed.

The lid according to the embodiment in FIGS. 9 and 10 has a hollow knob 121, for lifting the lid, secured in a conventional way (for example by means of a screw 122) to the covering element 102. The actuator 110 is housed inside the cavity of the knob 121 and is substantially of the same type as that previously described.

Figure 13:
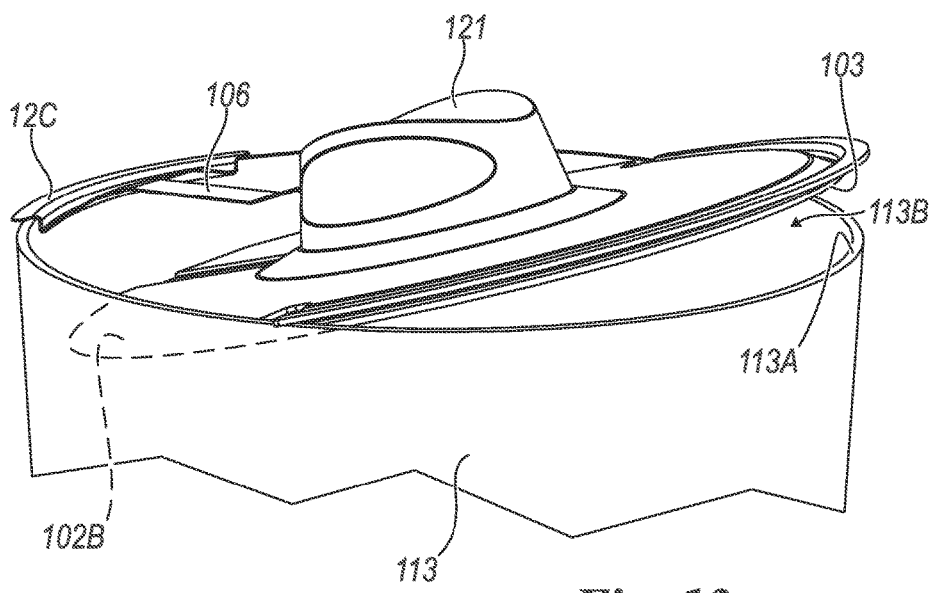
FIG. 13 is a simplified and partial perspective view of the lid when it is placed on a container for cooking food, in an opening position.

The covering element 102 has a part 102A provided with a rim 103 protruding perimetrically and suitable for resting on the edge 113A of the container 113, and a part 102B that lacks said protruding rim and suitable for penetrating inside the container (as shown in FIG. 13).

Advantageously the part 102A extends over a portion smaller or equal to 50% of the total surface of the covering element 102 and more preferably over a portion smaller or equal to 40%.

The distance between the resting and tilting portions 118 and 119 is therefore preferably less than the diameter of the lid. At these resting and tilting portions 118 and 119 the covering element has two recessed portions 124 and 125 (FIG. 10).

The shaped element 104 has an elongated element 106 terminating in an end portion 120 wider than that previously described (20) and provided with a protruding rim 120A similar to the rim 103 of the part 102A of the covering element 102, so as to improve the support of the shaped element 104 during the tilting of the lid.

The shaped element 104 has its other end 106B (FIG. 11) rigidly connected, for example by means of a screw 126, to the covering element 102 and to the inside of the cavity of the knob 121. From this end portion 106B extends a bridge portion 106C, also housed inside the knob 121 and suitable for acting as a movable arm on which acts the actuator, also housed inside the cavity of the knob 121.

The actuator 110 is configured in the form of a helical spring, one end of which is secured to the covering element 2, for example by means of folded portions 108 of the covering element, while the other end of the screw is secured to the shaped element 104 by means of folded portions 111 of the shaped element.

Advantageously, the cavity 121A (FIG. 12) of the knob 121 is shaped so as to serve also as an end stop for the movement of the shaped element (as will be explained below).

Downstream of the bridge element 106C, the shaped element has the elongated element comprising an arm 106D which terminates with the end portion 120.

The first 118, second 119 and further 120 resting areas of the lid according to the embodiment in question allow the lid to remain resting on the upper free edge 113A of the container 113, given that there are at least three resting points between the lid 100 and the container 113.

Figure 12:
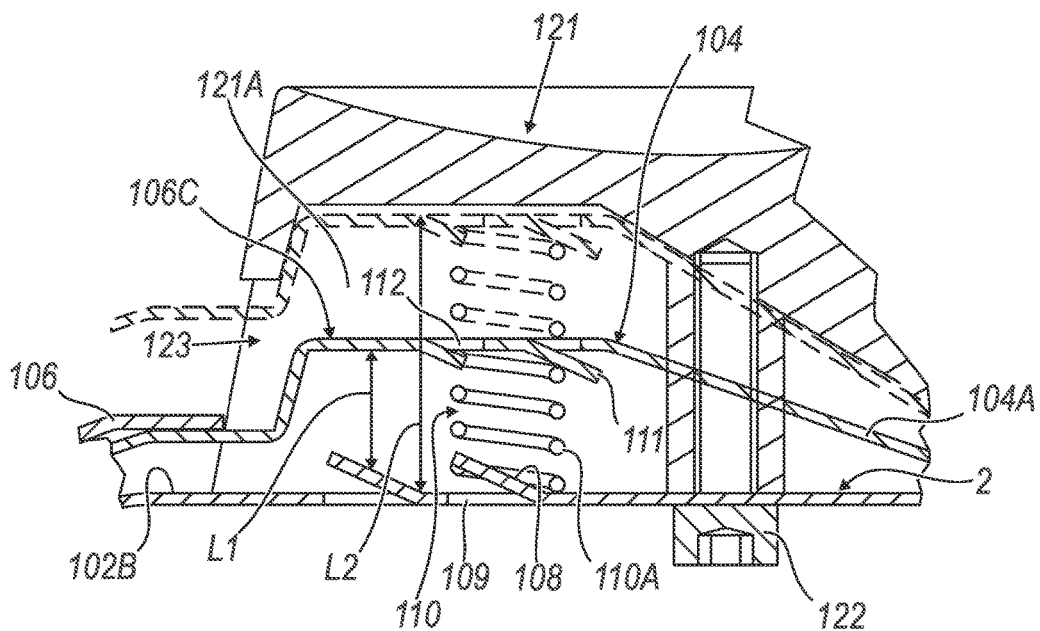
FIG. 12 is a simplified enlarged section of Detail C in FIG. 11.

As with the embodiment previously described, during heating of the container and its contents with the lid in a closure position (or with the covering element 102 resting on the upper edge 113A of the container and thus closing it), the hot air that rises from the liquid surface beneath is forced to escape upwards only through the holes 109, 112 and 123 in the knob (FIG. 12). The air therefore heats the areas around the holes 109 and 112 and consequently the actuator 110.

The actuator 110 namely, in the example shown, the spring 110A, is made and chosen so that up to a temperature of around 85° C. it remains unchanged and in a compressed form as shown in FIG. 12. On exceeding 85° C., it expands and lengthens so as to distance the covering element 102 from the shaped element 106 (FIG. 13) thus causing the lid to tilt.

Purely by way of example, the spring 110A could have a diameter of around 1 cm, a length L1 (FIG. 12) in the compressed condition of 1 cm and a length L2 of around 2 cm in the activated condition (therefore at a temperature higher than 85° C.), capable of generating a force of around 10 N.

In fact, the tilting or inclination of the covering element occurs about an axis L' (FIG. 10) passing through the first 118 and second 119 resting area between the covering element 102 and free edge 113A of the container 113, since by virtue of the expansion of the actuator above a pre-set temperature, the shaped element 104 and the covering element 102 move away from each other. Consequently, the covering element 102 lowers with respect to the resting area 120, thus generating the situation shown schematically in FIG. 13. Obviously, in order to allow the lid to achieve the opening position it is important to appropriately balance the elasticity of the shaped element 104 and the force of the actuator 110 (spring) which must be capable of bending said element in order to reach the opening position.

Substantially, in the opening configuration, an opening 113B (FIG. 13) is created on the container that is sufficiently large to prevent the contents from escaping, with the benefits of avoiding the drawbacks previously described caused by the undesired formation of foam.

When the temperature of the actuator 110 falls below the set temperature (for example 85° C.) the actuator returns to the dimension L1 in FIG. 12. The particular form and elasticity of the shaped element 104 incline the covering element 102 so that said covering element closes the container 113 again.

Figure 14:
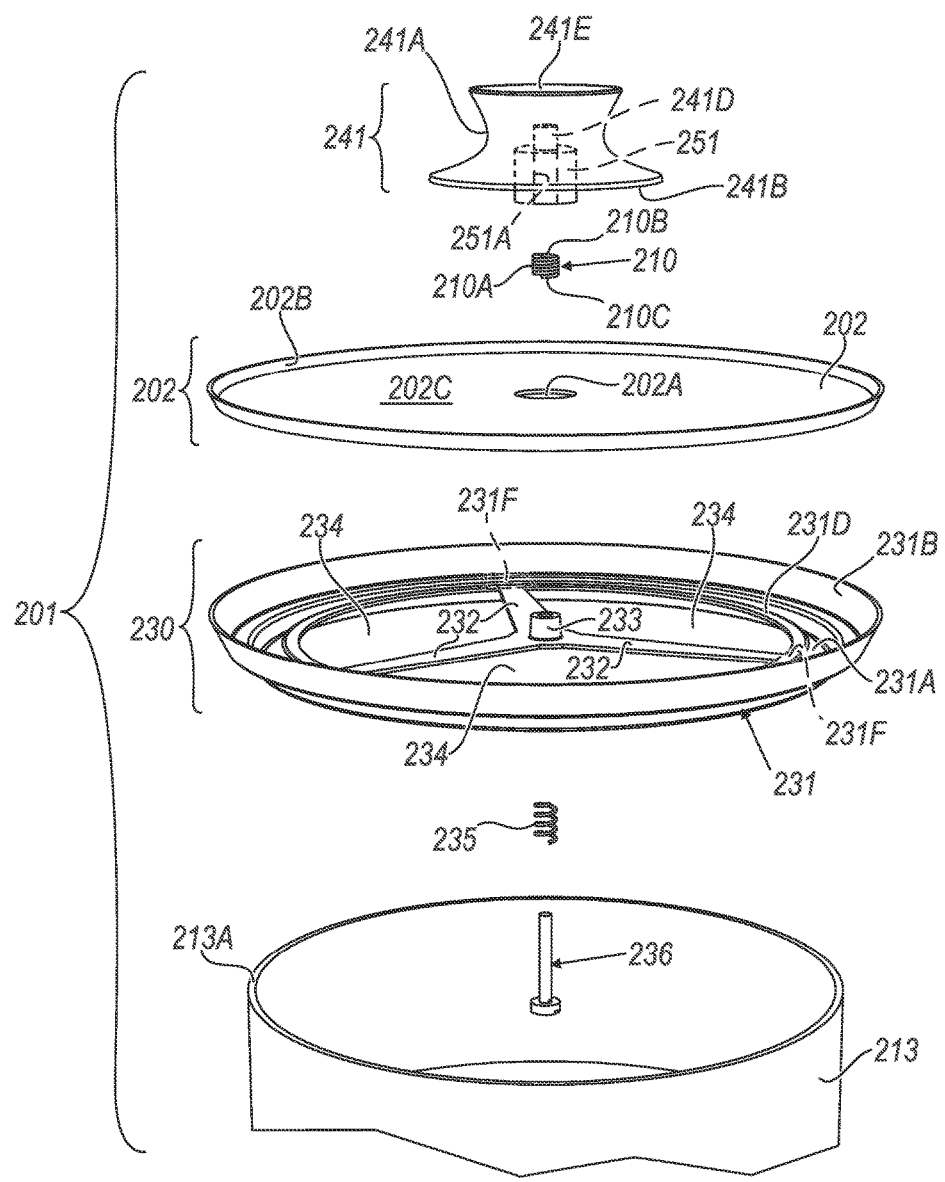
FIG. 14 is an exploded schematic view of another variation of the invention.

FIGS. 14-16 show another embodiment of a lid according to the invention, said lid 201 being suitable for covering conventional containers 213 designed to cook or boil foods.

The lid preferably has a substantially circular plan. Obviously, the lid may have any plan form depending on the shape of the opening of the container that it is designed to cover. By way of example, the plan could have a configuration that is elliptical, rectangular, etc.

The lid has a supporting shaped element 230 and a covering element 202.

The supporting shaped element 230 is in the form of a wheel, with an outer ring 231 suitable for resting on the edge 213A of the container 213 and radial arms 232 suitable for connecting the outer ring 231 to a central tubular guiding element 233 and delimiting open windows 234.

The outer ring 231 preferably has a first wall 231A (FIG. 15), suitable for resting on the edge 213A of the container 213 to be closed with the lid, an outer wall 231B, preferably inclined, which delimits a seat 231C open at the top and flared (capable of being closed or open, depending on the temperature of the container 213 by the covering element 202 as shown in FIGS. 15 A,B) and an internal wall 231D to which are connected the arms 232, preferably having a V-shaped cross-section so as to form an internal lateral end stop for the free edge 213A of the container 213 and to centre the lid with respect to the container.

Figure 15A:
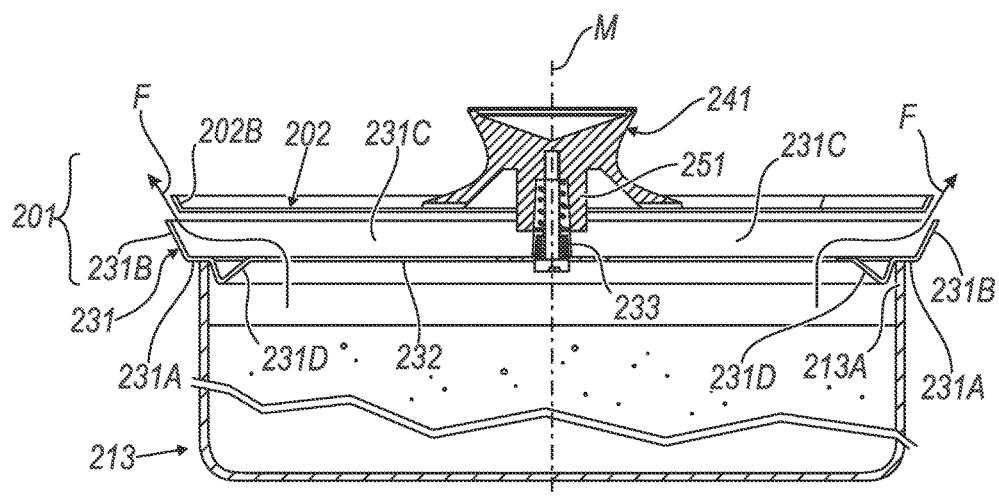
Figure 15B:
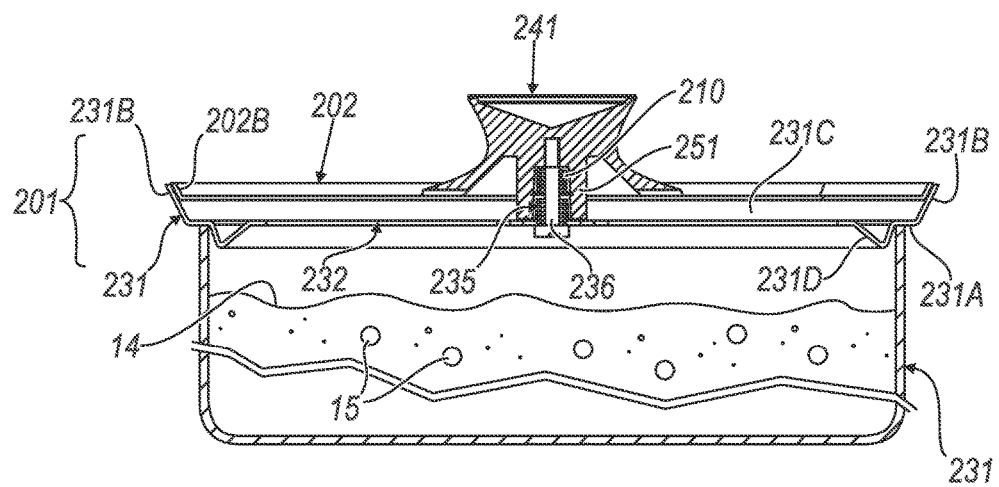

Advantageously as illustrated in FIGS. 15A and 15B and as discussed above the outer ring 231 with its walls 231D, 231A and 231B delimits a seat 231C, which is provided beneath the end stop surface of the movable covering element 202 with the ring 231, and which is suitable for collecting the possible liquid which escapes from the container 213 and/or the liquid coming from the condensation which can be formed on the internal surface of the movable covering element 202, so that such liquids do not escape from the cooking container.

The flaring of the outermost wall 231B of the supporting shaped element 230 favours the lid to close, as will be explained in further detail below, in that the outermost edge 202B of the covering element 202 also has an analogous flaring so that, as shown in FIG. 15B, these two walls can match each other when the lid is in the closure position (FIG. 15B).

The radial arms 232 are preferably flat and coplanar with the wall 231A of the outer ring 231.

The guiding central tubular element 233 (FIG. 16) preferably extends from the upper face of the supporting shaped element 230, namely into the seat 231C delimited by the flared outer lateral walls 231B. The central element 233 has a seat suitable for housing a conventional helical return spring 235, the purpose of which will be described in further detail below. At the bottom, the spring 235 abuts on the head of a screw 236 connecting the various parts of the lid and, at the top, on a ring 237 (FIG. 16A) of the central tubular guiding element of the supporting element 230. This ring 237 is also penetrated by the screw 236.

The covering element 202 is dimensioned so as to be able substantially to cover the entire mouth of the container 213, or at least 90% of the opening delimited by the edge 213A of the container 213 and more preferably at least 100% of said opening or even more as shown in FIG. 15.

Preferably, the covering element is a disc with a central hole 202A enabling the passage of a bottom tubular guide portion 251 of a knob 241 of the lid, and with a slightly flared edge 202B.

The knob 241 has a conventionally shaped outer body having a bottom base wall 241B capable of resting on the top face 202C of the covering element 202, a lateral wall 241A and a top wall 241E. The lateral wall 241A is shaped externally so as to make the knob easier to grasp, and internally has an internal cavity 241F from a top wall of which the tubular portion 251 extends centrally. This tubular portion 251 delimits a seat 251A (FIG. 14) which houses an actuator 210 and a portion of the screw 236, an end portion of which engages in a threaded seat 241D made in the top part of the knob 241 and opens inside said seat 251A of the tubular portion 251.

The tubular portion 251 is suitable for sliding and being guided by the outer wall of the central tubular element 233 as will be explained below, when the lid passes from the closure position to the opening position and vice versa.

The actuator 210 is preferably a helical spring 210A (FIG. 14), made of a shape memory material, and its top end 210B abuts against a top wall 241F (FIG. 16A) of the seat 251A of the tubular portion 251, and its bottom end 210C (FIG. 14) abuts against a top face of the ring 237 (FIG. 16) of the tubular central guide element 233 of the supporting element 230 (on the bottom face of said ring 237 (as previously explained) the spring 235 also abuts).

The operation of this lid is as follows.

Figure 16A:
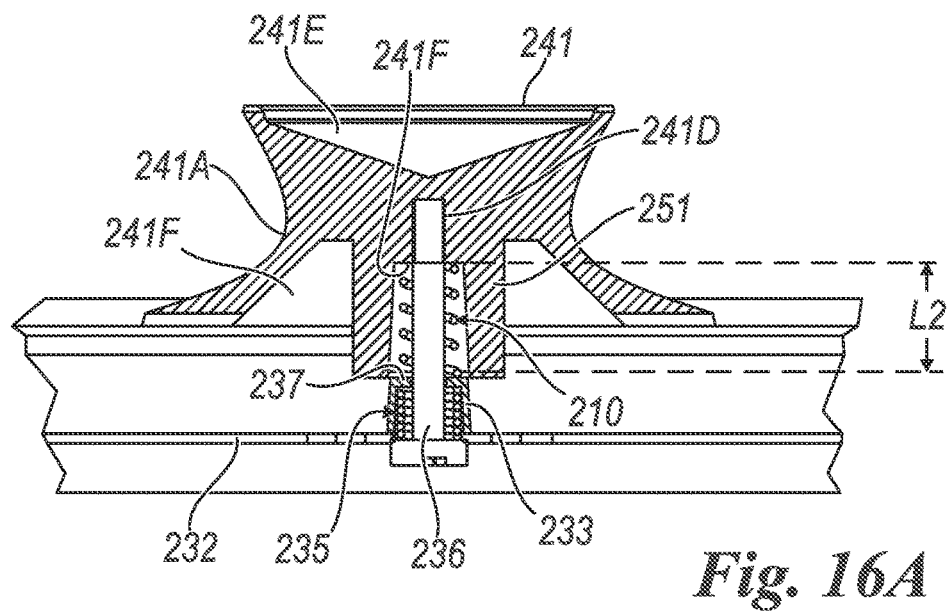

As illustrated in FIGS. 16A,B, during use, the lid is placed on a container 213, for example a saucepan or a pot, which contains, for example, water 14 in which food 15 is cooked. The container is placed over a heat source, for example over a gas hob (not shown).

In this condition, the flat wall 231A of the supporting element 230 rests round the entire length of the free edge 213A of the container 231, but in fact what is important for the purposes of the present invention is that the supporting shaped element 230 has at least two diametrically opposed resting portions or several portions uniformly angularly spaced apart (shown by the dotted lines in FIG. 14 and indicated by the number 231F). In this simplified version of the supporting shaped element (comprising only portions 231F of the supporting wall 231) the flared lateral wall 231B could even be absent.

In the technical solution in question, the lid is required to open (by moving vertically above the container along an axis passing through the centre of the lid) when the contents of the container reach around 95° C., or before the foam in the container dislodges the lid and escapes from the container.

During heating of the container and its contents with the lid in a closure position (namely with the covering element 202 resting on the lateral wall 231B of the supporting shaped element 230 as shown in FIG. 15B), the hot air rising from the liquid surface beneath, heats the screw 236 and the central guide element 233 of the supporting shaped element 230 and consequently also the actuator 210.

It is calculated that in the position in which the actuator 210 is located, by virtue of all of the heat exchanges that occur with the hot air, when the temperature of the water is approximately 95° C., a temperature of around 85° C. is reached in the actuator (these values are given by way of example and clearly can vary depending on the configuration and arrangement of the various parts, the materials used for the specific embodiment, etc.).

In this case the actuator 210, namely in the example shown the spring 210A, is therefore made and chosen so that up to a temperature of 85° C. it remains unchanged and with a compressed form, as shown in FIG. 15B. On exceeding 85° C., it suddenly expands and lengthens so as to distance the covering element 2 from the supporting shaped element 230 (FIG. 15A), thus causing a lifting coaxial to the central axis M of the lid (FIG. 15A) of the covering element 202, as clearly shown in FIG. 15A.

Purely by way of example, the spring could have a diameter of around 1 cm, a length L1 in the compressed condition of 1 cm and a length L2 of around 2 cm in the activated condition (therefore at a temperature of over 85° C.), capable of generating a force of around 10N.

In fact, the movement of the covering element 202 occurs coaxially to an axis M passing through the centre of the lid and perpendicular to the lid itself (FIG. 16A) since by virtue of the expansion of the actuator 210 above a pre-set temperature, the covering element 2 moves away from the supporting shaped element 230.

Consequently, the covering element 202 rises with respect to the shaped supporting element 230, thus creating the situation shown schematically in FIG. 16A, (here the lid 1 is in the opening position).

Obviously, in order to allow the lid to achieve the opening position it is important to appropriately balance the elasticity of the return spring 235 and the force of the actuator 210 (spring) which must be capable of overcoming the opposing force exerted by the spring 235 in order to reach the opening position.

Essentially, in the opening configuration an opening 213B is created in the lid (FIG. 15A) that allows a flow F (FIG. 15A) of hot air and/or steam to escape from the container 213 in a sufficient amount as to prevent foam from escaping from the container, with the benefits of avoiding the above-described drawbacks caused by the undesired formation of foam. The opening 213 advantageously affects the entire perimeter of the lid.

In other words, the invention described enables the automatic translation of a movable part of the lid with respect to a fixed part along a vertical axis M passing through the centre of the lid when inside the container a pre-set temperature near boiling (which we can operationally set at around 85° C.) is reached.

Figure 16B:
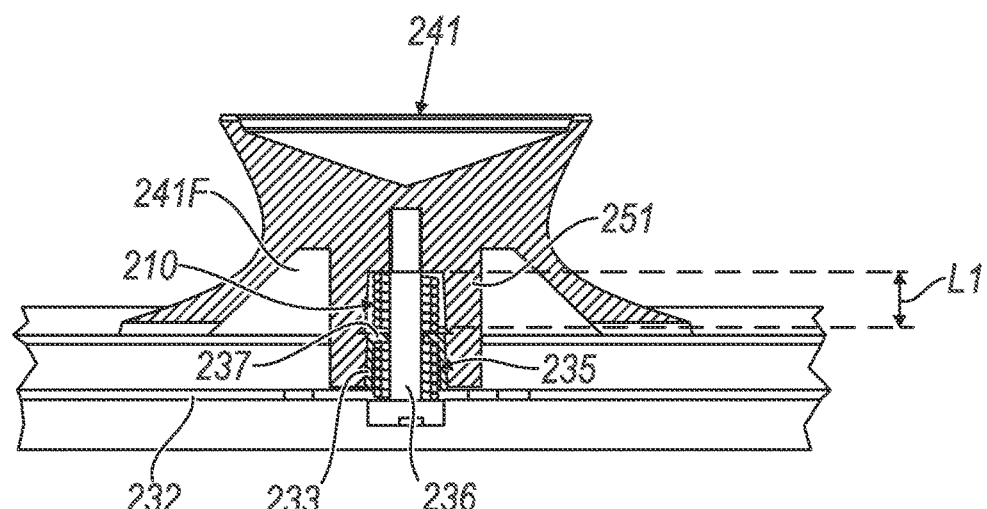

When the temperature of the actuator 210 falls below the programmed temperature (for example 85° C.) the actuator returns to the initial dimension L1 shown in FIG. 16B. The elasticity of the spring 235 acting on the covering element 202 brings the latter to a closed position with its free edge flush with the inclined wall 231B of the shaped supporting element 230, that is so that said covering element closes the container 213 again.

Note that the present embodiment shows a very small actuator, which is appropriately dimensioned during the design phase. This allows its costs to be contained. In fact, the high technology of the materials used to produce it obviously makes it expensive.

The materials and the embodiments of the covering element and the shaped element, like every other component of the lid may be of a different type (chiefly metals or technopolymers).

In particular, the covering element of this solution, like all of the others discussed previously and below can be made entirely or only partly of a transparent material.

FIGS. 17-22 show a variation of the embodiment shown in FIGS. 14-16. For the sake of brevity, the elements previously described with reference to the embodiment in FIGS. 14-16 that are common also to the embodiment shown in FIGS. 17-22 will not be described again and will be indicated by the same reference numerals used in FIGS. 14-16 but with the addition of 100.

Compared to the solution previously described, the most significant operational difference lies in the fact that the positions of the return spring 335 and the shape memory spring 310A (suitable for opening the lid on reaching a pre-set temperature) have been axially inverted. Furthermore, according to this variation, the lateral inclined wall 331B of the supporting shaped element 331 is inclined towards the centre of the lid, not towards the outside of the lid (as in the embodiment shown in FIGS. 14-16), in this way the dimensions of the covering element 302, and particularly its diameter, can be reduced and at the same time the lid can be used on containers of different diameters.

The supporting shaped element 330, as in the previous embodiment, is preferably wheel-shaped with a outer ring 331 having a wall 331A suitable for resting on the edge of the container 313 and radial arms 332 suitable for connecting the outer ring 331 with a central connecting element 333 (FIG. 18) having a through hole for a screw 336 (FIG. 21).

The outer ring 331 preferably has an outer wall 331B, preferably inclined towards the inside of the lid whose top edge 331F (FIG. 22) is suitable for acting as an abutment for a corresponding perimetral edge 302B of the covering element 302 when the lid is closed.

Advantageously as illustrated in FIGS. 19 and 20 the outer ring 331 with its walls 331B, 331A delimits a seat 331C, which is provided beneath the end stop surface 331F of the movable covering element 302 with the ring 331, and which is suitable for collecting the possible liquid which escapes from the container 213 and/or the liquid coming from the condensation which can be formed on the internal surface of the movable covering element 302, so that such liquids do not escape from the cooking container.

The central connecting element 333 of the supporting shaped element 330 is suitable for serving as a fixed anchor point for one end of the screw 336, for this purpose the connector 333 and the screw 336 have conventional securing means, which for example include a threaded through hole 333A (FIG. 21B) in which engages said end of the screw 336, a portion of which protruding beneath said connector 333, is advantageously also secured to the connector 333 by means of a bolt and a washer 336A.

Also abutting, centrally, against the top face of the connection 333 is the thermal actuator 310, which in the example is shown as a helical spring 310A of the same type as that previously described, penetrated by the screw 336.

The other end of the spring 310A abuts against a bottom face of a bush 350 rigidly connected to the centre of the covering element 302.

The covering element is disc-shaped and has a central hole in which to house the bush 350. At this central hole and on the top face of the covering element rests a bottom surface 341B of the knob 341, also having a central hole, for the screw 336 to pass through and to house a portion of the bush 350.

The knob is formed of two parts: one bottom 360 and one top 361, suitable for sliding one inside the other. The bottom part 360 of the knob 341 has the previously mentioned bottom wall 341B, from which extend two tubular guide elements 360A and 360B concentric with each other and with the vertical axis M of the lid, and the screw 336 of the lid.

The top part 361 of the knob 341 has a shaped body, suitable for acting as a gripping element for the knob, and having a cylindrical internal cavity 361A, concentric with axis M of the lid, and dimensioned so that the inner wall of said cavity is suitable for sliding and being guided by the outer wall of the tubular guiding element 360A of the bottom part of the knob. Inside the knob is housed the return spring 335, one end of which abuts against a top wall 361 of the cavity 361A of the top part 361 of the knob 341, while the other end abuts against the bush 350 rigidly connected to the covering element 302. The two parts 360, 361 of the knob 341 are connected together by the screw 336 whose head 336C is housed in a seat 361C provided in the top face of the top part 361 of the knob 341.

In the lid according to the variation in question the screw 336, which develops coaxially to the central axis M of the lid, connects together all of the components of the lid.

The operation of this lid is as follows.

As illustrated in FIG. 22, during use, the lid is placed on a container 313, such as a saucepan or a pot, inside which there is, for example, water 14 in which food 15 is cooked. The container is placed over a heat source, for example over a gas hob (not shown).

In this condition the flat wall 331A of the supporting shaped element 330 rests round the entire length of the free edge of the container 331, but in fact what is important for the purposes of the present invention is that the supporting shaped element 330 has at least two diametrically opposed resting portions or several portions uniformly angularly spaced apart (shown by dotted lines in FIG. 18 and indicated by the number 331F). In this simplified version of the supporting shaped element (comprising only portions 331F of the supporting wall 331) the inclined lateral wall 331B could even be absent.

In the technical solution in question the, lid is required to open (by moving vertically above the container along an axis M passing through the centre of the lid) when the contents of the container reach around 95° C., namely before the foam in the container dislodges the lid and escapes from the container.

Figure 21A:
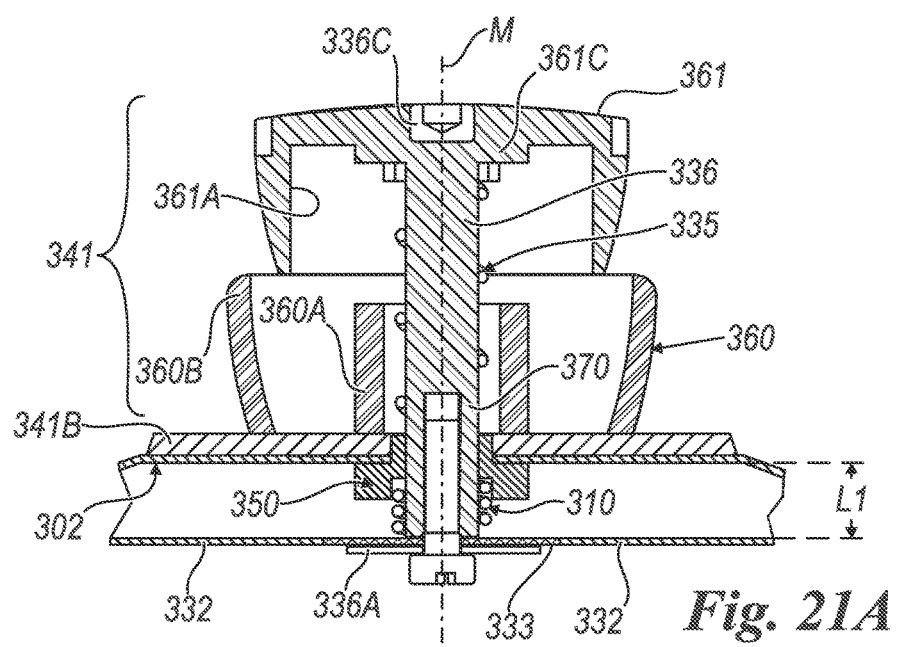

During heating the container and its contents with the lid in the closure position (that is with the covering element 302 resting on the lateral wall 331B of the supporting shaped element 330 as shown in FIGS. 17 and 21A), the hot air rising from the liquid surface beneath, heats the screw 336 and the central connecting element 333 of the supporting shaped element 330 and consequently also the actuator 310.

It is calculated that in the position in which the actuator 310 is located, by virtue of all of the heat exchanges that occur with the hot air, when the temperature of the water is around 95° C., a temperature of around 85° C. is reached in the actuator (these values are given by way of example and clearly can vary depending on the configuration and arrangement of the various parts, the material used for the specific embodiment, etc.)

Figure 21B:
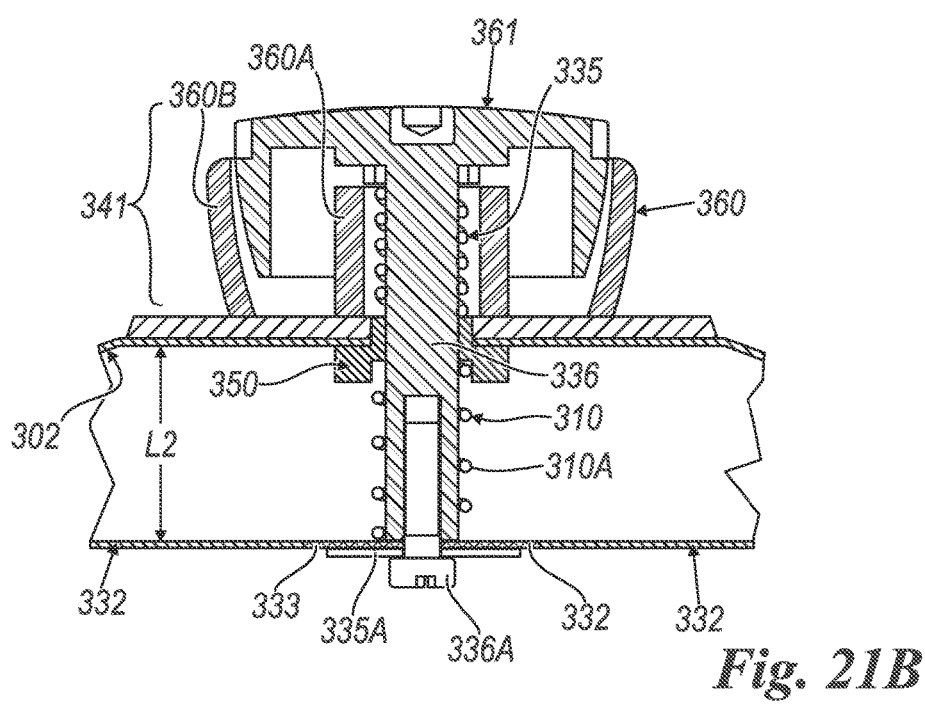

In this case the actuator 310, namely in the example shown the spring 310A, is therefore made and chosen so that up to a temperature of 85° C. it remains unchanged and with a compressed form as shown in FIG. 21B. On exceeding 85° C., it suddenly expands and lengthens so as to distance the covering element 302 from the supporting shaped element 330 (FIG. 21B), thus causing a lifting coaxial to the central axis M of the lid (FIGS. 21B and 22) of the covering element 302, as clearly shown in FIG. 22.

Purely by way of example, the spring could have a diameter of around 1 cm, a length L1 in the compressed condition of 1 cm, and a length L2 of around 2 cm in the activated condition (therefore at a temperature of over 85° C.), capable of generating a force of around 10 N.

In fact, the movement of the covering element 302 occurs coaxially to an axis M passing through the centre of the lid and perpendicular to the lid itself (FIG. 21B) since by virtue of the expansion of the actuator 310 above a pre-set temperature, the covering element 302 moves away from the supporting shaped element 330.

Consequently, the covering element 302 rises with respect to the shaped supporting element 330, thus creating the situation shown schematically in FIGS. 21B and 22 (here the lid 1 is in the opening position).

Obviously, in order to allow the lid to achieve the opening position it is important to appropriately balance the elasticity of the return spring 335 and the force of the actuator 310 (spring) which must be capable of overcoming the opposing force exerted by the spring 335 in order to reach the opening position.

Essentially, in the opening configuration, an opening 313B is created in the lid (FIG. 22) that allows a flow F of hot air and/or steam to escape from the container 313 in a sufficient amount as to prevent foam from escaping from the container, with the benefits of avoiding the above-described drawbacks caused by the undesired formation of foam. The opening 313 advantageously affects the entire perimeter of the lid.

In other words, the invention described enables an automatic translation of a movable part of the lid with respect to a fixed part along a vertical axis M passing through the centre of the lid when inside the container a pre-set temperature near boiling (which we can operationally set at around 85° C.) is reached.

When the temperature of the actuator 310 falls below the programmed temperature (for example 85° C.) the actuator returns to the initial dimension L1 shown in FIG. 21A. The elasticity of the spring 335 acting on the covering element 302 brings the latter to a closed position with its free edge adhering with the inclined wall 331B of the shaped supporting element 330, namely so that said covering element closes the container 313 again.

Note that the present embodiment shows a very small actuator, which is appropriately dimensioned during the design phase. This allows its costs to be contained. In fact, the high technology of the materials used to produce it obviously makes it expensive.

The materials and the embodiments of the covering element and the shaped element, like every other component of the lid may be of a different type (chiefly metals or technopolymers).

In the variation shown, the knob 341 is completely guided during its travel and the diameter of the screw 336 is chosen so as to guide the spring 310A during its travel, and to guide also the spring 335, a tubular bush 370 may be fitted onto the screw.

FIGS. 23-25 show another embodiment of a lid according to the invention, said lid 401 being suitable for covering conventional containers 413 designed for cooking or boiling food.

The lid preferably has a substantially circular plan. Obviously, the lid may have any plan form depending on the shape of the opening of the container that it is designed to cover. By way of example, the plan could have a configuration that is elliptical, rectangular, etc.

The lid has a supporting shaped element 430 and a movable covering element 402.

The supporting shaped element 430 has a form similar to that of conventional lids but with a large window 434. The supporting shaped element therefore has an annular edge 431 suitable for resting on the edge 413A of a container 413 and connected to a disc-shaped part 432 suitable for closing the mouth of the container 413 delimited by said edge 413A, with the exception of an opening 434 which in the example shown in the figures has the form of a circular sector. The annular edge 431 preferably has a stepped profile with a top wall 431A capable of resting on the edge 413A of the container 413, and a bottom wall 431B slightly flared and connecting said resting wall 431A to the disc-shaped part 432 of the supporting shaped element 430.

The supporting shaped element also preferably has a guide slot 470, in the shape of an arc of a circle 470, concentric to the axis of symmetry M of the lid, into which is inserted a pin 471 which extends from and is integral with a bottom face of the knob 441. The supporting shaped element also preferably has an anchoring pin 472 for a temperature-sensitive actuator 410 which, in the example shown, has the form of a spiral strip 410A which has one of its ends anchored to said pin 472 and the other end anchored to a pin 473 secured to the bottom face of the knob 441.

The supporting shaped element 430 also preferably has a central through hole for the passage of a screw 436 coaxial to the axis M of the lid. The screw connects the supporting shaped element 430 to the knob 441, in a conventional manner for a person skilled in the art, leaving the knob free to rotate about the central axis of symmetry M of the lid but not also to translate vertically.

The covering element 402 and the knob 441 are preferably secured together in a conventional manner for a person skilled in the art (for example by means of a pin 480, FIG. 24A), so that when the knob rotates it also drags round said covering element.

The knob 430 has an outer body of a conventional type suitable for making it easier to grasp the lid; internally preferably it has a cavity 451 suitable for housing the thermal actuator 410 and enabling it to expand as a result of an increase in temperature.

The covering element is preferably in the form of a sector of a circle and is dimensioned so as to be able to close the window 434 of the supporting shaped element 430 when said covering element overlaps said window (as in FIG. 24A). Advantageously the covering element has an extreme edge 402B having the same stepped profile as the annular edge 431 of the supporting shaped element 430 and suitable for overlapping and sliding over said annular edge 431.

The operation of this lid is as follows.

As illustrated in FIG. 23, during use, the lid is positioned on a container 413, for example a saucepan or a pot, which contains, for example, water 14 in which food 15 is cooked. The container is placed over a heat source, for example over a gas hob (not shown).

In this condition, the annular edge 431 of the supporting shaped element 430 rests round the entire length of the free edge of the container 331 and also closes the container because the covering element 402 is placed over and closes the window 434. Note that, when the container is not hot the covering element is pushed by the actuator 410 into the position shown in FIG. 23A, namely into the position in which the window 434 is closed.

In the technical solution in question the lid is required to open by rotating the covering element 402 coaxially to the central axis of symmetry M of the lid thus uncovering the window 434, when the contents of the container 413 reach around 95° C., or before the foam in the container dislodges the lid and escapes from the container.

Figure 23B:
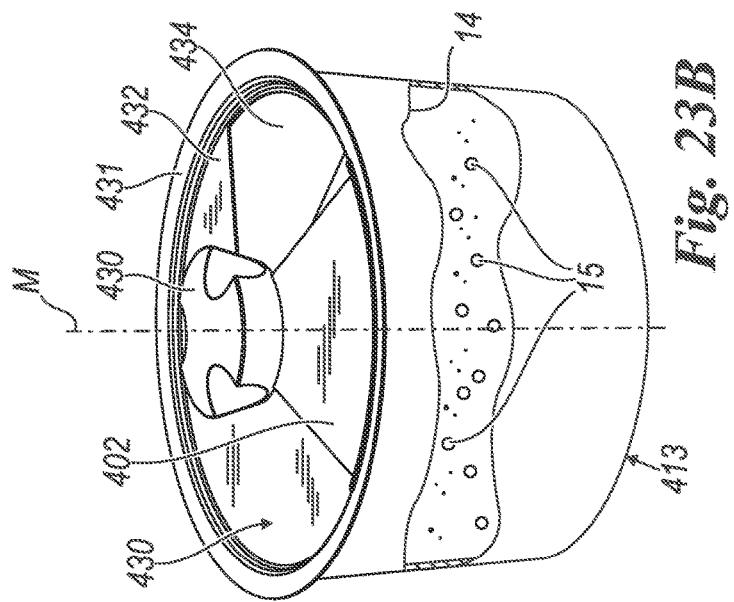
Figure 23A:
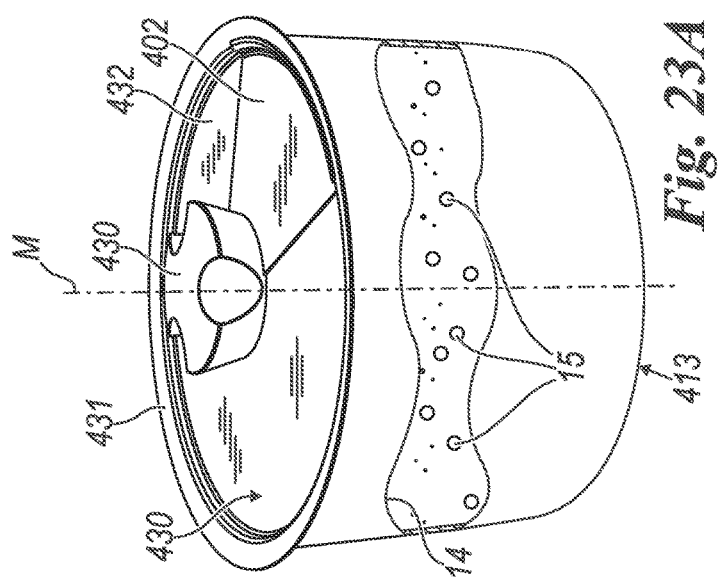

During heating of the container and its contents with the lid in the closure position (that is with the covering element 402 closing the window 434 of the supporting shaped element 430 as shown in FIGS. 23A and 24A), the hot air that rises from the liquid surface beneath heats the supporting shaped element 430 and consequently also the actuator 410.

It is calculated that in the position in which the actuator 410 is located, by virtue of all of the heat exchanges that occur with the hot air, when the temperature of the water is around 95° C., a temperature of around 90° C. is reached (these values are given by way of example and clearly can vary depending on the configuration and arrangement of the various parts, the materials used for the specific embodiment, etc.).

In this case the actuator 410, namely in the example shown, the spiral strip 410A is therefore made and chosen so that at a temperature of 90° C. it has achieved its maximum deformation and consequently has dragged the covering element 402 into its maximum opening position, completely uncovering the window 434.

The spiral strip is advantageously a bimetallic strip, which undergoes a gradual deformation as the temperature in the container increases, causing a rotation of the knob 430 and the covering element 402 connected to it and consequently the opening of the window 434 of the lid, as clearly shown in FIG. 23B.

In fact, the movement of the covering element 402 is rotational and occurs coaxially to an axis M passing through the centre of the lid and perpendicular to the lid since, by virtue of the expansion of the actuator 410 as from a pre-set temperature, the covering element 402 rotates with respect to the supporting shaped element 430. The actuator, when the temperature decreases, returns to its initial position also bringing the knob 430 and covering element 402 back to said initial position and thus also closing the window 434.

Essentially, in the opening configuration an opening 434 is created in the lid that allows a sufficiently large flow of hot air and/or steam to exit the container 413 to prevent foam from escaping from the container, with the benefits of avoiding the above-described drawbacks caused by the undesired formation of foam. In other words, the invention described allows an automatic rotation of a movable part of the lid in relation to a fixed part about a vertical axis M passing through the centre of the lid when inside the container a pre-set temperature close to boiling (which we can set operationally at around 85° C.) is reached.

The materials and the embodiments of the covering element and the shaped element, like every other component of the lid, may be of a different type (chiefly metals or technopolymers).

FIG. 26 shows a first variation compared to the embodiment shown in FIGS. 23-25. In this variation the only difference compared to the solution previously described lies in the fact that, instead of the window 434, the covering element 430 has a plurality of holes 434A arranged in the form of a sector of a circle and suitable for being closed/opened by the rotation of the covering element 402 as previously shown.

Figure 27A:
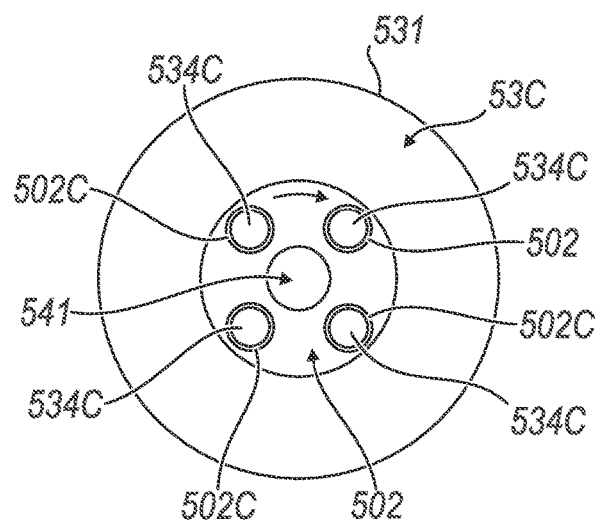
Figure 27B:
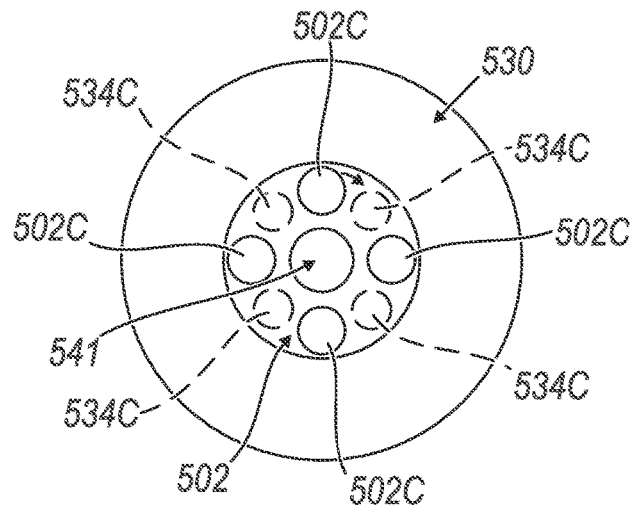

FIGS. 27 A and B show a second variation compared to the embodiment shown in FIGS. 23-25. In this variation, the window 434 in the form of a sector of a circle of the supporting shaped element 430 has been replaced by a plurality of circular openings 534C arranged around a concentric circular crown near and concentric to the knob 541. The shape of the covering element 502, connected to the knob 541, also has a different form. In this variation it is disc-shaped and has a number of openings or windows 502C having the same form and the same arrangement as the openings 534C in the supporting shaped element 530, so that the covering element 502 can assume a closure position (FIG. 27B) in which its openings 502C are not overlapped with the openings beneath 534C of the supporting shaped element 530, so the lid is closed, and an opening position (FIG. 27A) in which its openings 502C overlaps the openings beneath 534C of the supporting shaped element 530, so the lid is open or allows a hot flow to escape from the container. The covering element 502 is translated in rotation in a manner identical to that described with reference to the solution in FIGS. 23-25.

FIGS. 28 A and B show another variation compared to the embodiment shown in FIGS. 18-21. In this variation, the thermal actuator suitable for moving the movable part of the lid has been modified. The parts of the lid of the variation in question that are the same as those described with reference to the solution in FIGS. 18-21 shall not be further described and shall be indicated in FIG. 28 by the same reference numbers used in FIGS. 18-21, but increased by 300.

This variation no longer has an actuator made with a shape memory spring but an actuator 680 that comprises a spring 680A, for example a helical spring, of a conventional type and a bimetallic strip 680B suitable for interacting with a groove 680C provided in a central shaft 661A of the top part 661 of the knob 661. The bimetallic strip is secured in a conventional manner, for example by means of a pin 680, to the covering element 602 and/or to the knob 641 and is of the type suitable for deforming gradually, for example of contracting, on reaching a pre-set temperature. The bimetallic strip is housed for example in a seat made between the top face of the bush 650 and the bottom face of a central portion of the covering element 602.

In the case in question, the bimetallic strip is for example of the type suitable for contacting by around 1 mm on reaching a temperature of 85° C. Only the free end 680D closest to the shaft 661 of the knob 641 can contract since the other end is secured by the pin 680C.

The lid has a knob with a central shaft 661 whose bottom end is secured, for example by means of a bolt 636A, to a central connecting portion 633 of the supporting shaped element 630. The knob has two parts 661 and 660 which can slide telescopically one inside the other and which have within them walls 660 A and B suitable for limiting and guiding their travel.

In the rest position (FIG. 28B) the outer free edge 602B of the covering element 602 rests on the free edge 631F of the supporting shaped element 630 closing the lid and the container on which the lid is resting. In this closure position the spring 680A is compressed and the pin 661 of the knob 641 is secured by the free end 680D of the bimetallic strip 680B which engages in a groove or notch 680C in the shaft 661 of the knob. In this position the two parts 660, 661 of the knob 641 cannot move with respect to each other and consequently neither can the covering element 602, which is integral with the knob 641, move with respect to the supporting shaped element 630. In this condition, therefore, the lid is closed. On reaching a pre-set temperature, for example 75° C., the bimetallic strip starts to bend and at a pre-set temperature, for example 85° C., the strip 680B has bent to such an extent as to disengage itself from the notch 680C. Consequently the shaft 661 of the knob 641, no longer being locked by the end 680D of the strip 680B, under the action of the force exerted by the spring 680A is released upwards dragging up in an upward translation movement coaxial to the axis M of the lid also the covering element 602 and the bottom part 660 of the knob 641. This travel is limited and guided by the interaction between the internal walls 660 A-C of the two parts of the knob.

The bending of the strip 680B and the force of the spring 680A thus automatically cause the lid to assume the configuration shown in FIG. 28A in which the lid has a large perimetral opening from which hot air or steam can escape.

In order to return the lid to a closed position, it is necessary to wait until it cools down below a pre-set temperature. At this point, by manually pushing down the bottom part 660 of the knob 641, the lid returns to the closed position (FIG. 28B) with the end 680C of the strip 680B clicking into the notch or groove 680C which will click into the groove 680C of the shaft 661 of the knob 641, thus securing the shaft in this position.

As this last technical solution does not make use of costly shape memory springs, it is cheaper to produce.

Note that the actuator 680 just described as having no shape memory spring could also be used in the technical solutions previously described, as an alternative to shape memory springs.

FIGS. 29A-B show a variation of the embodiment of FIGS. 17-22. The elements previously described with reference to the embodiment of FIGS. 17-22 and also in common with the embodiment of FIGS. 29A-B, for brevity of the description, shall not be further described and shall be indicated by the same reference numbers used in FIGS. 17-22, but increased by 400, except where referenced further below.

With respect to the solution previously described, the most relevant functional difference is linked to the fact that the ring element 731 has a shape flared towards the inside of the container 714. Ring element 731 comprises a plurality (for instance four) of steps 790A-D, so that the lid can rest on the top free edge of a plurality of containers having different diameters.

The steps 790A-D each provide a wall 791A-D horizontal or more preferably inclined towards the inside of the container 714 and a wall 792A-C vertical or more preferably inclined towards the inside of the container 714.

The ring element 731 defines a seat 731C flared towards the inside of the container.

A plurality (for instance three) of arms 732 having centrally a central connection element 733 and delimiting three wide openings 734 (having a whole width bigger or equal to a fifth of the whole surface covered by the lid and more preferably bigger or equal to at least a third of said surface) extend from the ring element 731, and preferably integral therewith.

The covering element 702 is shaped and dimensioned so as to abut against the flat or inclined surface 790A closest to the chamber defined by the cooking container, when it is in closure position.

A knob 741, preferably of the type having two parts suitable to slide telescopically with respect to each other, is constrained to the covering element. Preferably a centrally located internal part 761 is fixed while the outer part is axially mobile.

The outer part 760 of the knob is rigidly constrained to the covering element for example by means of screws 760C passing in holes provided in the covering element and engaged in a base wall 760B of said outer part 760.

Preferably the lid has a pin 736 (see FIG. 30A) having a threaded top end 736C which is engaged in a corresponding threaded seat of the internal part 761 of the knob so that it results rigidly connected to the pin 736, and a lower end 736D also threaded, which passes through a central hole of the shaped element 730 (the shaped element 730 having arms 732) and is rigidly connected thereto by means of nuts 736A and 736B. For the opening/closure of the covering element 702 on reaching a pre-set temperature in the container 714 on which the lid is placed, a return spring 735 and a shape memory spring 710 (suitable for opening the lid on reaching said pre-set temperature by contrasting the spring 735) are provided on the lid, fitted on the pin 736.

According to the invention the springs 735 and 710 could be substituted by a mechanical actuator and a thermal actuator suitable for operating the same technical functions as the springs described.

Advantageously the outer part 760 of the knob 741 has at least one window 760A which allows to view a portion 761A provided on the outer surface of the fixed internal part 761 of the knob, and displaying for example a particular colour (for example a red colour) when the covering element is in opening position. Such colour is suitable for warning a user of the lid that this latter is in opened position and thus an overheating situation has been generated in the container, which has determined the automatic opening of the lid.

Note that thanks to the fact that the seat 731C of the lid is flared towards the inside of the container such seat is not only suitable for collecting the possible liquid which escapes from the container and/or the liquid coming from the condensation which can be formed on the internal surface of the movable covering element so that such liquids do not escaped from the cooking container; but it is also suitable for transporting said liquids towards the inside of the container.

The operation of the lid is as follows.

During the use, the lid is placed on a container, for example a saucepan or a pot, which contains, for example, water in which food is cooked. The container is placed over a heat source, for example over a gas hob (not shown).

In this condition one of the walls 790A-D of the supporting shaped element 730 rests round the entire length of the free edge of the container, but in reality what is important for purposes of the present invention is that the supporting shaped element 730 provides at least two diametrically opposed rest portions or several portions uniformly angularly spaced apart. In the technical solution in question, the lid is required to open (by moving vertically above the container, along an axis M passing through the centre of the lid) when the contents of the container reaches around 95° C., namely before the foam in the container dislodges the lid and escapes from the container.

During heating the container and its contents with the lid in the closure position, the hot air rising from the liquid surface beneath, heats the pin 736 and the nuts 736A and B and consequently also the shape memory spring 710.

It is calculated that in the position in which the shape memory spring 710 is located, by virtue of all of the heat exchanges that occur with the hot air, when the temperature of the water is around 95° C., a temperature of around 85° C. is reached in the shape memory spring 710 (these values are given by way of example and clearly can vary depending on the configuration and arrangement of the various parts, the material used for the specific embodiment, etc.).

In this case the shape memory spring 710, in the example provided as a thermal actuator, is therefore made and chosen so that up to a temperature of 85° C. it remains unchanged and with a compressed form. On exceeding 85° C., it suddenly expands and lengthens so as to distance the covering element 702 from the supporting shaped element 730, thus causing a lifting coaxial to the central axis M of the lid of the covering element 702.

Purely by way of example, the spring could have a diameter of around 1 cm, a length in the compressed condition of 1 cm, and a length of around 2 cm in the activated condition (therefore at a temperature above 85° C.), capable of generating a force of around 10N.

In fact, the movement of the covering element 702 occurs coaxially to an axis M passing through the center of the lid and perpendicular to the lid itself. Obviously, in order to allow the lid to achieve the opening position it is important to appropriately balance the elasticity of the return spring 735 and the force of the shape memory spring 710 which must be capable of overcoming the opposing force exerted by the spring 735 in order to reach the opening position.

Essentially, in the opening configuration, an opening 713B is created in the lid that allows a flow F of hot air and/or steam to escape from the container in a sufficient amount as to prevent foam from escaping from the container, with the benefits of avoiding the above-described drawbacks caused by the undesired formation of foam. The opening 713B advantageously affects the entire perimeter of the lid.

Advantageously, by way of example, the opening 713B has an extent equal to at least 2%, and more preferably equal to at least 5%, and even more preferably equal to at least 8% of the surface of the opening of the container on which the lid according to the invention rests.

When the temperature of the shape memory spring 710 falls down to the programmed temperature (for example 85° C.), the shape memory spring 710 automatically returns to the initial dimension through the action of the spring 735.

The invention claimed is:
1. A lid for a container for cooking food, said lid for resting on a free edge of said container and said lid comprising:
a covering element,
a shaped element,
and a pin connecting together said covering element and shaped element,
said covering element and said shaped element being configured to allow movement between:
a closure operating position of the lid, in which said covering element and said shaped element combine to close the cooking container on which the lid rests,
and an opening operating position of the lid, suitable for allowing venting of the container when the lid rests thereon and to prevent the escape from the container of cooking fluids,
and at least one thermal actuator suitable, on reaching a first pre-set temperature, for automatically moving the covering element with respect to the shaped element to bring the shaped element in said opening operating position, to allow venting of the container when the lid is placed upon the container;
wherein the shaped element comprises: an outer ring for resting on the free edge of the container, radial arms for connecting said outer ring with a central connecting element and a plurality of through openings for being closed or left opened by the covering element, when the covering element is respectively in the closure operating position or the opening operating position.

2. The lid according to claim 1, wherein the thermal actuator comprises at least one thermal actuator element made of a shape memory alloy or of a bimetal.

3. The lid according to claim 2, comprising a knob comprising at least two parts suitable for moving telescopically with respect to each other, the covering element being rigidly connected to one of said at least two parts of the knob.

4. The lid according to claim 2, comprising an automatic movement device for the covering element for moving the covering element automatically at least from the closure operating position to the opening operating position, and an activation member sensible to temperature for activating said automatic movement device on reaching a pre-set temperature.

5. The lid according to claim 1, wherein the thermal actuator comprises at least one thermal actuator element in the form of a spring.

6. The lid according to claim 1, wherein the thermal actuator is housed inside a cavity provided in a central knob or in a portion of the lid provided beneath said central knob.

7. The lid according to claim 1, comprising a spring for automatically moving the covering element with respect to the shaped element for taking the covering element from the opening operating position to the closure operating position.

8. The lid according to claim 1, comprising knob and said knob comprises elements for acting as an end stop at least for movement of the covering element from the closure operating position to the opening operating position.

9. The lid according to claim 1, comprising a knob comprising at least two parts suitable for moving telescopically with respect to each other, the covering element being rigidly connected to one of said at least two parts of the knob.

10. The lid according to claim 1, comprising an automatic movement device for the covering element for moving the covering element automatically at least from the closure operating position to the opening operating position, and an activation member sensible to temperature for activating said automatic movement device on reaching a pre-set temperature.

11. The lid according to claim 10, wherein the activation member comprises a bimetallic strip.

12. The lid according to claim 1, wherein the outer ring has walls for delimiting a seat for collecting possible liquid which escapes from the container and/or liquid coming from condensation which can be formed on an internal surface of the covering element so such liquids do not escape from the cooking container.

13. The lid according to claim 1, wherein the outer ring has a shape flared towards the inside of the container and having a plurality of annular steps having different diameters or the covering element abuts on a wall of an annular step having a minor diameter.

14. The lid according to claim 1, wherein the outer ring has a shape flared towards the inside of the container and having a plurality of annular steps having different diameters and the covering element abuts on a wall of an annular step having a minor diameter.

* * * * *